(12) United States Patent
Heyner

(10) Patent No.: US 10,706,416 B2
(45) Date of Patent: *Jul. 7, 2020

(54) SYSTEM AND METHOD OF GENERATING AND VALIDATING ENCAPSULATED CRYPTOGRAPHIC TOKENS BASED ON MULTIPLE DIGITAL SIGNATURES

(71) Applicant: INSTITUTIONAL CASH DISTRIBUTORS TECHNOLOGY, LLC, Palos Verdes Estates, CA (US)

(72) Inventor: Mark A. Heyner, Golden, CO (US)

(73) Assignee: INSTITUTIONAL CASH DISTRIBUTORS TECHNOLOGY, LLC

( * ) Notice: Subject to any disclaimer, the term of this patent is extended or adjusted under 35 U.S.C. 154(b) by 163 days.

This patent is subject to a terminal disclaimer.

(21) Appl. No.: 15/911,684

(22) Filed: Mar. 5, 2018

(65) Prior Publication Data

US 2018/0196950 A1    Jul. 12, 2018

Related U.S. Application Data

(63) Continuation of application No. 14/019,989, filed on Sep. 6, 2013, now Pat. No. 10,423,952, which is a
(Continued)

(51) Int. Cl.
*H04L 29/00* (2006.01)
*G06Q 20/38* (2012.01)
(Continued)

(52) U.S. Cl.
CPC ......... *G06Q 20/3829* (2013.01); *G06F 21/60* (2013.01); *G06F 21/602* (2013.01);
(Continued)

(58) Field of Classification Search
CPC ............... H04L 63/083; H04L 63/0428; H04L 63/0853; H04L 63/0861; H04L 9/32;
(Continued)

(56) References Cited

U.S. PATENT DOCUMENTS 5,276,444 A    1/1994  McNair
5,557,518 A    9/1996  Rosen
(Continued)

OTHER PUBLICATIONS

U.S. Appl. No. 14/019,989, filed Sep. 6, 2013.
(Continued)

*Primary Examiner* — Ghazal B Shehni
(74) *Attorney, Agent, or Firm* — Barnes & Thornburg LLP

(57) ABSTRACT

Functional data for use in one or more digital transactions are secured by using an encapsulated security token (EST). In certain embodiments, the EST is created by encapsulating digital data including the functional data using at least two cryptographic systems of two parties. The encapsulation and subsequent de-encapsulation can utilize cryptographic systems of the parties that involve a private key for signing and decryption and a public key for encryption and signature verification. If constructed carefully over a series of rigorous events, the resulting EST can be practically impossible to counterfeit. In addition, a propagation of rights can be tracked for auditing and rights can be easily terminated or modified.

34 Claims, 2 Drawing Sheets

Related U.S. Application Data continuation-in-part of application No. 13/888,322, filed on May 6, 2013, now Pat. No. 10,410,213, and a continuation-in-part of application No. 13/888,233, filed on May 6, 2013, now Pat. No. 10,410,212.

(60) Provisional application No. 61/643,195, filed on May 4, 2012.

(51) Int. Cl.
  G06F 21/60 (2013.01)
  G06F 21/64 (2013.01)
  H04L 9/32 (2006.01)

(52) U.S. Cl.
  CPC ............ *G06F 21/64* (2013.01); *G06Q 20/385* (2013.01); *G06Q 20/3823* (2013.01); *G06Q 20/3825* (2013.01); *H04L 9/321* (2013.01); *H04L 9/3234* (2013.01); *H04L 9/3247* (2013.01); *H04L 2209/56* (2013.01)

(58) Field of Classification Search
  CPC ..... H04L 9/321; H04L 2209/56; H04L 63/08; H04L 63/123
  See application file for complete search history.

(56) References Cited

U.S. PATENT DOCUMENTS

| | | | |
|---|---|---|---|
| 5,659,616 A | 8/1997 | Sudia | |
| 5,671,279 A | 9/1997 | Elgamal | |
| 5,677,955 A | 10/1997 | Doggett | |
| 5,784,463 A | 7/1998 | Chen et al. | |
| 5,790,677 A | 8/1998 | Fox | |
| 5,794,207 A | 8/1998 | Walker | |
| 5,910,987 A | 6/1999 | Ginter | |
| 5,943,423 A | 8/1999 | Muftic | |
| 5,995,625 A | 11/1999 | Sudia | |
| 6,029,150 A | 2/2000 | Kravitz | |
| 6,189,103 B1 | 2/2001 | Nevarez | |
| 6,212,504 B1 | 4/2001 | Hayosh | |
| 6,327,578 B1 | 12/2001 | Linehan | |
| 6,523,012 B1 | 2/2003 | Glassman | |
| 6,959,423 B2 | 10/2005 | Kinnis | |
| 7,069,443 B2 | 6/2006 | Berringer | |
| 7,103,575 B1 | 9/2006 | Linehan | |
| 7,177,847 B2 | 2/2007 | Atkinson | |
| 7,188,003 B2 | 3/2007 | Ransom | |
| 7,290,138 B2 | 10/2007 | Freeman | |
| 7,580,988 B2 | 8/2009 | Rudd | |
| 7,587,368 B2 | 9/2009 | Felsher | |
| 7,631,188 B2 | 12/2009 | Valente | |
| 7,644,037 B1 | 1/2010 | Ostrovsky | |
| 7,904,722 B2 | 3/2011 | Sudia | |
| 8,055,589 B2 | 11/2011 | Saito | |
| 8,060,931 B2 | 11/2011 | Dillaway | |
| 8,225,378 B2 | 7/2012 | Dillaway | |
| 8,316,237 B1 | 11/2012 | Felsher | |
| 8,341,045 B2 | 12/2012 | Kravitz | |
| 8,556,164 B1 | 10/2013 | Freedman | |
| 8,566,596 B2 | 10/2013 | Stephenson | |
| 8,656,503 B2 | 2/2014 | Becker | |
| 8,682,802 B1 | 3/2014 | Kannanari | |
| 8,688,589 B2 | 4/2014 | Cronic | |
| 8,719,165 B2 | 5/2014 | Royl | |
| 8,938,783 B2 | 1/2015 | Becker | |
| 9,094,212 B2 | 7/2015 | Thomas | |
| 9,189,777 B1 | 11/2015 | Dickinson | |
| 2001/0005839 A1 | 6/2001 | Maenpaa | |
| 2002/0007343 A1 | 1/2002 | Oyama et al. | |
| 2002/0013898 A1 | 1/2002 | Sudia | |
| 2002/0133467 A1 | 9/2002 | Hobson | |
| 2002/0184517 A1 | 12/2002 | Tadayon | |
| 2003/0074271 A1 | 4/2003 | Viswanath | |
| 2003/0074273 A1 | 4/2003 | Miller | |
| 2004/0073518 A1 | 4/2004 | Atkinson | |
| 2004/0073801 A1 | 4/2004 | Kalogridis | |
| 2004/0111375 A1 | 6/2004 | Johnson | |
| 2004/0181818 A1 | 9/2004 | Heyner | |
| 2004/0243811 A1 | 12/2004 | Frisch | |
| 2005/0033813 A1 | 2/2005 | Bhogal | |
| 2005/0102188 A1 | 5/2005 | Hutchison | |
| 2005/0119978 A1 | 6/2005 | Ates | |
| 2006/0080546 A1 | 4/2006 | Brannon | |
| 2006/0089912 A1 | 4/2006 | Spagna | |
| 2006/0168663 A1 | 7/2006 | Viljoen | |
| 2007/0198434 A1 | 8/2007 | Jang | |
| 2007/0199057 A1 | 8/2007 | Plummer | |
| 2007/0245158 A1 | 10/2007 | Giobbi | |
| 2007/0271149 A1 | 11/2007 | Siegel | |
| 2008/0066159 A1 | 3/2008 | Dillaway | |
| 2008/0066170 A1 | 3/2008 | Dillaway | |
| 2008/0046718 A1 | 8/2008 | Grab et al. | |
| 2008/0243702 A1 | 10/2008 | Hart | |
| 2008/0263422 A1 | 10/2008 | Bardouillet | |
| 2008/0283591 A1 | 11/2008 | Oder et al. | |
| 2009/0048940 A1 | 2/2009 | Hill | |
| 2009/0198617 A1 | 8/2009 | Soghoian | |
| 2010/0049658 A1 | 2/2010 | Sanchez et al. | |
| 2010/0154040 A1 | 6/2010 | Chiu | |
| 2010/0251353 A1 | 9/2010 | Hodgkinson | |
| 2010/0306081 A1 | 12/2010 | Hutchison | |
| 2011/0093934 A1 | 4/2011 | Le Saint | |
| 2011/0099107 A1 | 4/2011 | Saxena | |
| 2011/0189981 A1 | 8/2011 | Faith | |
| 2011/0225643 A1 | 9/2011 | Faynberg | |
| 2012/0191979 A1 | 7/2012 | Feldbau | |
| 2013/0007858 A1 | 1/2013 | Shah | |
| 2013/0013931 A1 | 1/2013 | O'Hare | |
| 2013/0191884 A1 | 7/2013 | Leicher | |
| 2013/0317990 A1 | 11/2013 | Heyner | |
| 2013/0318619 A1 | 11/2013 | Heyner | |
| 2013/0346112 A1 | 12/2013 | Chasten | |
| 2014/0189797 A1 | 7/2014 | Nori | |
| 2014/0331058 A1 | 11/2014 | Heyner | |
| 2014/0365781 A1 | 12/2014 | Dmitrienko | |
| 2015/0142665 A1 | 5/2015 | Dicker | |
| 2015/0150110 A1 | 5/2015 | Canning | |
| 2015/0228039 A1 | 8/2015 | Mahgoub | |
| 2016/0189136 A1 | 6/2016 | Mercille | |
| 2016/0292601 A1 | 10/2016 | Pakanathi | |

OTHER PUBLICATIONS

U.S. Appl. No. 13/888,233, filed May 6, 2013.
U.S. Appl. No. 13/888,322, filed May 6, 2013.
Examination Report; EP Application No. 13 784 445.2; dated Oct. 22, 2019.

SYSTEM AND METHOD OF GENERATING AND VALIDATING ENCAPSULATED CRYPTOGRAPHIC TOKENS BASED ON MULTIPLE DIGITAL SIGNATURES

RELATED APPLICATIONS

This application is a continuation of U.S. application Ser. No. 14/019,989, entitled, "ENCAPSULATED SECURITY TOKENS FOR ELECTRONIC TRANSACTIONS," filed on Sep. 6, 2013, which is a continuation-in-part of U.S. patent application Ser. No. 13/888,322, entitled, "ENCAPSULATED SECURITY TOKENS FOR ELECTRONIC TRANSACTIONS," filed on May 6, 2013, and U.S. patent application Ser. No. 13/888,233, entitled, "SECURE TRANSACTION OBJECT CREATION, PROPAGATION AND INVOCATION," filed on May 6, 2013, both of which claim priority from U.S. Provisional Patent Application No. 61/643,195, entitled, "SECURE TRANSACTION OBJECT CREATION, PROPAGATION AND INVOCATION," filed on May 4, 2012. The contents of all of the above-noted applications are incorporated herein as if set forth in full and priority to all of these applications is claimed to the full extent allowable under U.S. law and regulations.

TECHNICAL FIELD

The present invention relates generally to electronic transactions cryptography and, in particular, to allowing a system and method for generating and validating a cryptographic token that encapsulates multiple digital signatures to increase security.

BACKGROUND AND SUMMARY

Functional data includes electronic data that can be used to, among other things, establish or verify an identity, access a data system or account, or otherwise enable functionality in a digital environment. We all live with functional data. We typically invoke myriad functional data elements on a daily basis to sustain and enrich our lives.

An important aspect of the functional data landscape is identity. Character-based identity elements such as name, birth date, social security number and street address are powerful elements of functional data. A drivers' license—with a number of its own—may entitle one to cast a vote, drive a car on a public road or purchase a bottle of wine.

The personal signature is an equally powerful image-based identity element. But—some special categories of transactions aside—the personal signature has been largely replaced by the digital persona. Proving your identity in the digital world involves its very own dimension of functional data, from usernames and passwords to PIN codes to security questions to any number of trivial details that can help to prove you are who you say you are.

With proof of identity, countless other dimensions of functional data become accessible. For example, a credit card number can be used to purchase a staggering variety of products. A bank account identifier or investment account number is generally required to access financial resources. An email address or phone number enables personal communication with other people all around the world. Under certain circumstances—particularly if one's identity has been compromised—any one of these functional data elements can be abused without the knowledge or express consent of their "owner."

In the digital world, protecting functional data has become very complicated. We regularly create lasting records of various functional data elements across countless digital systems and networks. Despite the best of intentions (in most cases) and the most advanced technologies, these systems and networks are increasingly vulnerable. If perpetrators can amass a sufficient number of functional data elements to convincingly portray your digital persona, they can invoke those elements to exploit your resources for their gain.

But we must share our functional data nonetheless, to invoke it for our own gain. In sharing it, we may authorize others to invoke it for a particular electronic transaction or transactions. Sometimes we do so as a matter of personal trust—such as sharing a credit card number with a spouse, a child, or an assistant, to invoke it for our benefit and/or for theirs. Other times we do so as a matter of commercial necessity—such as answering a series of personal questions for a customer service representative, handing a credit card to a waiter, or completing an online form for a trusted retailer.

The challenge is to somehow control propagation of authorization to use our functional data elements, and further to limit the scope for the use of our functional data elements in the digital world.

The inventive methods and systems described herein, while spanning a wide array of applications, leverage the same general concept, dubbed "Encapsulated Security Tokens" ("ESTs"). "ESTs" address the challenge of protecting functional data elements by requiring that any entity presenting such an element prove how they came to possess it. In certain implementations, legitimate possession is proven by an entity presenting, along with the functional data element itself, an EST that encodes the chain of propagation for that functional data element using a series of nested digital signatures. The functional data element can then be used in a digital transaction. As will be understood from the description below, such a digital transaction is not limited to financial transactions but encompasses all the ways that functional data may be used in a digital environment that involve transfer of data between parties.

The data components of this solution may include, within two or more nested iterations of digital signatures: 1) the functional data elements being secured, invoked, propagated, or otherwise used; 2) identifiers for the people or entities for whom the functional data elements are being authorized; 3) any conditions (optional) limiting use of the functional data elements by the people or entities for whom the functional data elements are being authorized; and 4) tagging on the signed object and associated data inclusions in subsequent iterations, enabling validation of the digital signature and thus authentication of the signed content.

The processing of this data may involve 1) a secure cryptographic system, applied with each nested iteration to one or more of i) the functional data elements, at least in part, ii) the identifier for the person or entity for whom the elements are being authorized, iii) any conditions limiting use of the elements, and iv) a signed object from a prior iteration (for all but the very first iteration); 2) a feedback mechanism at each iteration, which enables a functional data owner or custodian to actively track, model and manage the proliferation of its "data propagation tree"; and 3) an objective, such as preventing an unauthorized login, stopping unwanted spam, ensuring the integrity of a vote, or protecting a bank account. The cryptographic system, and in particular a digital signature system facilitated by the cryptographic system, provides value by encoding distinct events in the propagation of authorization to use functional data elements, essentially proving, for each of those events, that the owner or custodian of those functional data elements has personally granted rights with respect to those elements to another person or entity with the conditions specified. In general, there will also be an entity or entities managing or enforcing an EST policy to ensure the objective is met. Such management or enforcement may be executed by an application, an email provider, a voting aggregator, a bank or another party depending on the transaction context.

In certain applications and scenarios, the present invention involves multiple, nested digital signatures encoding successive propagation events. The point of multiple iterations is not merely to propagate authorization but rather to produce a single object that can be invoked to secure a future transaction process. The effect of multiple iterations is to join distinct datasets and distinct digital signatures through at least two events, where each successive event reaffirms all prior events. Consequently the functional data contained in the innermost signed object becomes incrementally more secure as conditions and digital signatures are added with each propagation event, producing an object that is very narrowly applicable and much more difficult to counterfeit.

In accordance with one aspect of the present invention, a method and apparatus ("utility") is provided for creating an EST. The utility involves obtaining first digital data from a first party of a prospective digital transaction. For example, the digital data may include functional data such as personal identification information, financial information or contact information. A processing system, such as one or more computers controlled by one or more entities, can then be used to generate the EST by encapsulating at least the first digital data using at least first and second cryptographic systems. In this regard, each of the cryptographic systems includes a signature and a signature verification. For example, a public key/private key system may be used for each of the cryptographic systems. The EST can then be made available to a party for use in a digital transaction. That party (the second party) may be the same as or different than the first party depending on the transaction context.

As noted above, the digital data is encapsulated at least twice using cryptographic systems to form an EST. In some cases, the digital data will be encapsulated many times as the functional data elements are propagated across a chain of custody. The security of the digital data is enhanced as the digital data is successively encapsulated because additional cryptographic systems are involved at each successive layer of encapsulation, thus further confounding any attempted fraudster. Preferably, each of the cryptographic systems utilized is an independent system so as to further reduce or substantially eliminate the possibility of unauthorized encapsulation. The successive layers of encapsulation also encode a chain of propagation that is useful for tracing the chain of propagation back to the original source, for auditing of appropriate propagation, and for termination or modifying the rights of any party or parties, among other things.

In the case of public/private key systems, encapsulation at each layer will generally be accomplished by digitally signing the digital data, and any other data included in the core or added thereto, using the private key furnished by a cryptographic system to the person/entity applying the signature. One exception to this, as will be clarified by the examples below, is that one layer of encapsulation may be accomplished using a public key for encryption in situations where the EST is presented for de-encapsulation to the party holding the private key mated to the public key. This may be thought of as a reflective case as the encapsulation is executed at least in part under the control of the party to whom the EST is presented for de-encapsulation. In any event, de-encapsulation in a public key/private key system involves a mirror image application of mated key pairs such that a digital signature is required in connection with at least one layer of encapsulation thereby ensuring security of propagation for the functional data elements.

The nature of the digital data and process for encapsulating that data can vary depending on the transaction context. For example, in cases where the electronic transaction involves a first party authorizing a second party to act on its behalf (e.g., an electronic power of attorney), the digital data may identify the first and second parties and a scope of authority granted, and at least the initial encapsulation may be executed under the control of the first party. Similarly, where the digital transaction involves allowing the second party to access an asset of the first party (such as a financial account, an email account or a phone number) the digital data may identify the asset and the second party, and at least one layer of encapsulation may be executed under control of the first party. As a further example, in the case where the digital transaction involves accessing an application (or other limited access resource), the digital data may include login credentials provided by a user and the initial encapsulation may be executed under the control of the application operator. It will be appreciated from the description below that many other scenarios are possible, particularly where functional data is propagated across a chain of multiple custodians. In such cases, the digital data may itself comprise, at least in part, an EST.

In accordance with another aspect of the present invention, a utility is provided for presenting or using an EST. The utility involves providing first digital data for use in generating and encapsulating an EST. Again, such digital data may include personal identification information, account information, contact information or other functional data. The utility further involves obtaining an EST where the EST is generated by encapsulating at least the first digital data using at least first and second cryptographic systems. Each of the cryptographic systems includes a digital signature and a signature verification. Presentation is accomplished by electronically presenting, in connection with a digital transaction, the EST together with functional data for the digital transaction. In this manner, the presenter can establish legitimate possession of the functional data including how the presenter came into possession of the functional data.

In accordance with a still further aspect of the present invention, a utility is provided for using a presented EST to authenticate the rights of the presenter of the EST to invoke functional data. The utility involves receiving functional data for a proposed transaction and an EST from a first user. Again, the EST has been generated by encapsulating at least first digital data using at least first and second cryptographic systems. The EST is then de-encapsulated to obtain the first digital data or a transformation thereof. The presented functional data or an equivalent transformation thereof can then be compared to the de-encapsulated first digital data to control the proposed digital transaction. In this regard, the de-encapsulated first digital data may include information verifying legitimate possession of the functional data. In a preferred implementation, at least an element of the encapsulated first digital data is identical to the corresponding presented element of the functional data so as to allow for ready comparison and provide self-executing functionality.

In accordance with a further aspect of the present invention, a utility is provided for use in propagating authority to use functional data in connection with a digital transaction.

The utility involves receiving the first digital data including at least functional data. The digital data may include additional information, for example, defining a scope of authority conveyed in relation to the functional data or limitations thereon. The utility further involves adding, to the digital data, information sufficient to identify an authorized party. An EST is then generated by encapsulating at least the first digital data and authorization data using at least first and second cryptographic systems. The EST can then be propagated to the authorized party. It will be appreciated that this process can be repeated multiple times across a chain of propagation resulting in a multiply-encapsulated data object. Data representing the chain of propagation encoded in the EST can be stored along with data from other ESTs, and used to track functional data propagation and to manage a propagation tree, e.g., by modifying or terminating rights with respect to a selected branch, sub-branch or the like.

In accordance with a still further aspect of the present invention, a method is provided for generating a multiply-encapsulated data object for securing functional data. The utility involves establishing a once-encapsulated data object by encapsulating at least one or more elements of functional data using a first cryptographic system. A multiply-encapsulated data object is then established by encapsulating at least the once-encapsulated data object using a plurality of further cryptographic systems. Each of the cryptographic systems includes a digital signature (generally used for encapsulating data) and a signature verification (generally used for de-encapsulating the data). Preferably, each of the cryptographic systems are independent systems. In this manner, counterfeiting and using the data object would require misappropriation of digital signatures from multiple sources. It will thus be appreciated that, unlike conventional systems, security is enhanced as the functional data is propagated across multiple parties in a chain of propagation and a series of digital signatures are applied to the object.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION OF THE DRAWINGS

Figure 1:
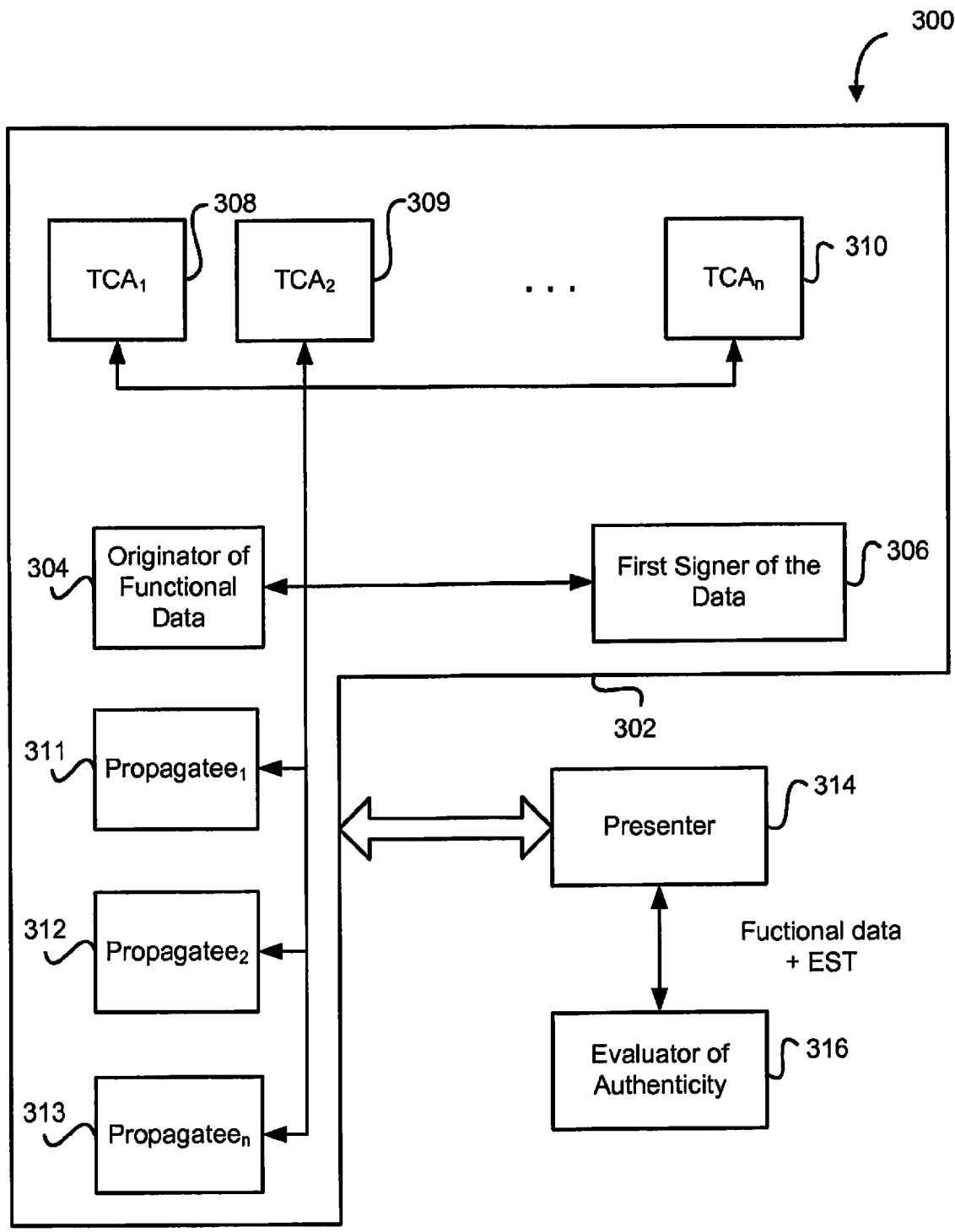
FIG. 1 is a schematic diagram of an encapsulated security token system in accordance with the present invention.

The EST structure and process is described below in connection with a series of enumerated example applications, both general and specific. For the sake of brevity, the number of propagation iterations has been limited to two or three. In most examples, the first iteration involves the true source of the functional data element, such as an email provider enabling a new email address. Even so, with ESTs it is possible to propagate authorization through any number of events/iterations, with electronic feedback to the source, enabling complex "authorization trees" that can originate at any level, and can be actively managed at any level.

Regarding digital signatures, in the examples below a digital signature is generally applied using a specific "private key" which is securely maintained by the signer, and which effectively "scrambles" the content to which it is applied. Only a specific "public key", explicitly paired with that private key, can be used to "descramble" the content in the signed object, as part of validating a digital signature. While this is a particularly advantageous implementation of the present invention and leverages existing infrastructures, the invention is not limited to this methodology for encapsulating and de-encapsulating functional data.

Moreover, with the vast majority of digital signature methods currently in use, the digital signature is applied to a hashed version of the original content. That hashed version, generated using a one-way hash function, is sometimes referred to as a "message digest". The original content for which a signature has been generated is provided along with the signed object as well, either separately from the signed object "in plain text" (the most common method), or encapsulated with the signed object itself.

Validating a digital signature involves performing the same one-way hash function on the (purported) original content—provided either encapsulated with or external to the signed object—and then comparing the result with the hashed version contained within the signed object. If the two hashed versions match exactly, the signature is considered valid. The hash function used in coordination with the digital signature function as described above substantially enhance the security of the digital signature methods currently in use.

While it is acceptable to use these existing digital signature methods to produce ESTs, the hash function is not inherently required to produce ESTs. Other methods for applying digital signatures have been proposed that do not involve a one-way hash function. Unless explicitly stated in the examples, the EST concept does not require a specific digital signature method—it only requires that the digital signature method employed is known to be secure, and that the original content is in some way associated with its respective signed object. This association is termed encapsulation herein regardless of the specific data structure involved.

As part of managing the propagation of authorization to use specific functional data elements, EST tokens can be invalidated at any level. Intentional invalidation and subsequent recreation of a token for the same purpose may require that a date/time stamp be included in the data signed by EST tokens, so that a new, otherwise identical token can be created with the same functional data elements and produce a different hash value.

Once an individual is in possession of a "private key", and/or in possession of the credentials necessary to access and use that private key, it is wholly up to that individual to protect that private key and/or the associated credentials. If that private key or those credentials are compromised, it will be possible for an unauthorized individual to apply digital signatures.

ESTs themselves are not intended to prove identity. For that, the examples presented herein assume the existence of a trusted authority or other entity that can effectively validate the identity of someone intent on applying a digital signature. Using different trusted authorities for the multiple digital signatures of an EST can improve security.

While EST's are not intended to prove identity, they make possible a broad array of applications for an individual who can prove their identity through other trusted means, and thus apply their digital signature to elements of functional data to propagate the authorization to use it.

As will be understood from the examples provided in detail below, a number of parties may be involved in creating, propagating, presenting and verifying ESTs. FIG. 1 is a schematic diagram of an EST system 300 that is useful in understanding these parties and their relationships. It will be appreciated that not all of these parties will be involved in all EST supported digital transactions. In addition, a single party may fulfill the functions of multiple parties as illustrated in FIG. 1. Finally, the relationships between the parties may change depending on the transaction context.

In the illustrated system 300, a number of parties 302 may be involved in the creation of an EST. The EST includes certain digital data at its core. In the examples below, this digital data includes elements of functional data. The parties 302 may include an originator 304 of functional data, a first encapsulator of the data (e.g., a first signer 306), at least a second encapsulator of the data (e.g., the originator 304 or one or more propagatees 311-313) and one or more trusted certificate authorities (TCAs) 308-310. Depending on the application, the originator 304 of the functional data may be, for example, the grantor of a power of attorney, an application user supplying login credentials, an email account owner, a possessor of a phone number, a voter, a credit card account owner, a disseminator of content, a bank account owner or other source of functional data.

In many cases, this functional data may be initially encapsulated by a first signer 306 of the data. The first signer 306 may be the same as or different than the originator 304 depending on the application. For example, the first signer 306 of the data may be a grantor of a power of attorney (who may be the originator of functional data identifying the grantor, an application operator (who may or may not be the originator of login credentials), an email account owner, a possessor of a phone number, a voter, a credit account owner, a content owner, a bank account owner, or other party serving as a source of authorization. The functional data is then encapsulated again by one of the parties noted above to form an EST.

The resulting EST may be propagated, in series, to one or more propagatees 311-313 (who may also be propagators). In connection with each such propagation, a further layer of encapsulation may be added to the object, for example, by adding information sufficient to identify the propagator, the propagatee and any conditions regarding use of the object. At each such encapsulation process, the encapsulating party (e.g., 304, 306, and/or 311-313) may utilize a digital signature system including a digital signature for encapsulating the object and information identifying a signature verification. For example, this may be accomplished by obtaining a public key/private key pair from a trusted certification authority 308-310. The private key can then be used to scramble and thereby encapsulate the data, and information sufficient to identify the public key can be tagged to the object to allow de-encapsulation. Additionally or alternatively, any or all of such tags can include a date and time of encapsulation and/or contact information for an authorized party, such as the party whose digital signature was applied to perform the encapsulation. In this regard, security may be enhanced where the successive signers utilize independent TCAs 308-310.

The resulting, multiply-encapsulated EST may then be provided to a presenter 314. The presenter 314 can then present functional data together with the EST to an evaluator of authenticity 316. In the simplest cases, the presenter 314 may be the same as one or both of the originator 304 and signer 306, or the presenter 314 may be another party such as one of the propagates 311-313. For example, in the voting example below, a voter may be the originator of functional data and the initial signer of the data. Subsequent encapsulation is provided as the vote is propagated through the voting system. In other cases, such as an electronic power of attorney example, the grantor may be the originator and initial signer whereas the grantee is the presenter. As a still further example, in the case of verifying application login credentials a user of the application may be both the originator of the functional data and presenter of functional data whereas the application operator may be the initial signer as well as the second encapsulator (e.g., using in this case a public key for the second encapsulation). However, in the last of these examples, the presenter may be different than originator if the originator has propagated access authority to a propagatee. Many other examples are possible. It will thus be appreciated the conceptual roles illustrated in FIG. 1 may be mixed and matched in many ways.

The evaluator 316 of authenticity receives the functional data and EST. In some implementations, at least one element of the functional data at the core of the EST may be identical to a corresponding element of the functional data presented together with the EST. In such cases, the evaluator can de-encapsulate the EST across two or more layers of encapsulation to retrieve the core functional data. The core functional data is then compared to the presented functional data to see if there is match. For example, a match may require that at least one element of core functional data is identical to a corresponding element of the functional data. The proposed digital transaction can then be controlled depending on the results of the match. As above, the evaluator 316 may be the same as or different from other parties of the system 300. For example, in the case of verifying application login credentials, the application operator may serve as the first and second encapsulator and evaluator. In many other cases as described below, the encapsulators and evaluator will be different parties.

Figure 2:
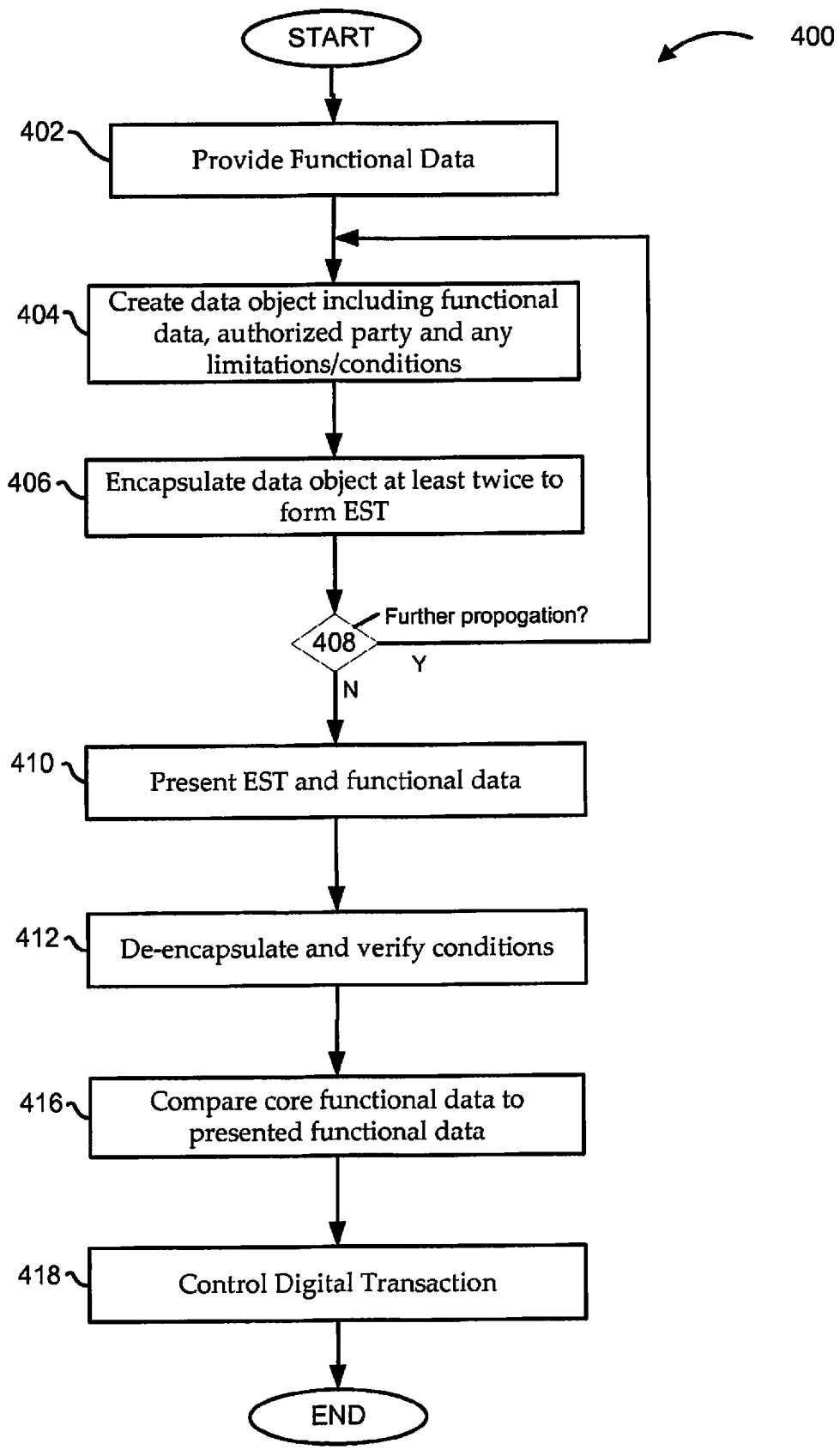
FIG. 2 is a flow chart illustrating an encapsulated security token process in accordance with the present invention.

FIG. 2 illustrates a corresponding EST process 400 in accordance with the present invention. The illustrated process 400 is initiated by providing (402) functional data such as personal identification data, account data, contact information or the like. A data object is then created (404) by combining the functional data with data sufficient to identify an authorized party and any limitations or conditions on use of the functional data. The resulting data object can then be encapsulated (406) by scrambling the first data object using a first private key of a digital signature system and second encapsulated using, in this example, a second private key of a second digital signature system, thus generating an EST.

As discussed above, if the data object is to be further propagated (408) to additional parties, this encapsulation process may be repeated. If not, the EST is presented 410 together with functional data to an evaluator, or provided to another party who presents the EST together with the functional data on behalf of the EST provider. The evaluator can then de-encapsulate (412) the EST starting at the outermost layer and verify compliance with any indicated conditions, including verifying that the provider of the EST, who may also be the presenter of the EST, is identified within the encapsulated object and thus authorized to use the functional data. The evaluator can obtain the core functional data and compare (416) the core functional data to the presented functional data to determine if there is a match. Based on this comparison the evaluator can control (418) the digital transaction. In general, if a match cannot be verified, if the provider of the EST has not been identified within the encapsulated object, or if the proposed usage of the functional data is not consistent with any conditions described within the encapsulated object, then the digital transaction will not be allowed to proceed but, if a match is verified, the provider of the EST has been identified, and the usage of the functional data is within the scope of any conditions described, the transaction may continue.

With the general framework set forth, the description continues below with a detailed description of a number of specific applications beginning with propagating identity.

Application 1: Propagating Identity

The primary functional data element defining identity is name; however, as any "Joe Smith" will tell you, name is by no means unique. Precisely defining identity can involve many other functional data elements, such as street address and date of birth.

The cases for entrusting another person or entity with your identity are well-known and typically handled by granting some form of "power of attorney." For example, if a person becomes incapacitated or is temporarily unable to manage their own affairs, they may entrust or may have entrusted another individual to handle their affairs on their behalf.

While legal procedures already exist to facilitate this, a mechanism for applying digital technologies to these procedures would be beneficial. Digital signatures, if produced correctly, are generally considered more secure than physical signatures. ESTs make it possible to securely propagate authorization to invoke functional data elements that assert identity.

Identity Process:
1. Identity_Setup1 Produce certificate and generate keys
    a. A person "UserA" proves their identity to a trusted certification authority "TCA1".
    b. TCA1:
        i. Applies TCA1's digital signature to one or more functional data elements defining the identity of UserA, producing a digital certificate "DCA".
        ii. Provides a means to validate that digital certificate as being authentic.
        iii. Associates UserA's digital certificate with a private/public key pair that UserA can use to apply/validate digital signatures.
        iv. Provides UserA's certificate and private/public keys to UserA.
2. Identity_Setup2 Grant power of attorney
    a. UserA applies UserA's digital signature to the combination of:
        i. UserA's name, address and date of birth, each of which were included in the functional data elements defining the identity of UserA that were signed by TCA1.
        ii. One or more data elements specifying the identity of another person, "UserB".
        iii. A condition limiting the power of attorney to any situation where UserA becomes incapacitated.
    b. The resulting signed object "TokenAB" is tagged with sufficient information "UserA_ID" identify UserA's public key, and provided to UserB.
    c. TokenAB effectively authorizes UserB to invoke the identity of UserA in order to manage UserA's affairs, if UserA were to become incapacitated.
3. Identity_Usage1 Invoke power of attorney
    a. A situation arises where UserA becomes incapacitated.
    b. While UserA is incapacitated, an issue arises with UserA's personal affairs, and UserA's identity must be asserted to resolve the issue.
    c. UserB presents TokenAB to the person or entity posing the identity requirement for UserA.
    d. The individual or entity posing the identity requirement:
        i. Verifies the identity of UserB.
        ii. Uses the public key associated with UserA_ID to validate UserA's signature on TokenAB
        iii. Verifies that UserA's name, address and date of birth are signed with TokenAB.
        iv. Verifies that the data elements specifying UserB's identity are signed with TokenAB.
    e. The individual or entity posing the identity requirement considers that requirement to have been satisfied.
4. Identity_Usage2 Invalid attempt to invoke power of attorney
    a. A situation arises where UserA becomes incapacitated.
    b. While UserA is incapacitated, an issue arises with UserA's personal affairs, and UserA's identity must be asserted to resolve the issue.
    c. UserX presents TokenAB to the person or entity posing the identity requirement for UserA.
    d. The individual or entity posing the identity requirement:
        i. Verifies the identity of UserX.
        ii. Uses the public key associated with UserA_ID to validate UserA's signature on TokenAB
        iii. Verifies that UserA's name, address and date of birth are signed with TokenAB.
        iv. Cannot verify that the data elements specifying UserX's identity are signed with TokenAB.
    e. The individual or entity posing the identity requirement rejects UserX's assertion of UserA's identity.
5. Identity_Setup3 Grant power of attorney with rights
    a. In the process of producing TokenAB, UserA additionally includes data representing "Propagation Rights".
    b. TokenAB thus additionally authorizes UserB to further propagate power of attorney for UserA to other people or entities.
6. Identity_Setup4 Propagate power of attorney
    a. UserB has obtained, from a trusted certification authority "TCA2" a private/public key pair that can be used to apply/validate digital signatures.
    b. UserB applies UserB's digital signature to the combination of:
        i. TokenAB, together with UserA_ID
        ii. One or more data elements specifying the identity of another person, "UserC".
        iii. A condition limiting the power of attorney to any situation where both UserA and UserB have become incapacitated.
    c. The resulting signed object "TokenABC" is tagged with sufficient information "UserB_ID" to identify UserB's public key, and provided to UserC.
    d. TokenABC effectively authorizes UserC to invoke the identity of UserA in order to manage UserA's affairs, if both UserA and UserB were to become incapacitated.
7. Identity_Usage3 Invoke propagated power of attorney
    a. A situation arises where both UserA and UserB have become incapacitated.
    b. While UserA and UserB are incapacitated, an issue arises with UserA's personal affairs, and UserA's identity must be asserted to resolve the issue.
    c. UserC presents TokenABC to the person or entity posing the identity requirement for UserA.
    d. The individual or entity posing the identity requirement:
        i. Verifies the identity of UserC.
        ii. Uses the public key associated with UserB_ID to validate UserB's signature on TokenABC.
        iii. Verifies that data elements specifying UserC's identity are signed with TokenABC.
        iv. Verifies that TokenAB is signed with TokenABC.
        v. Uses the public key associated with UserA_ID to validate UserA's signature on TokenAB.

vi. Verifies that UserA's name, address and date of birth are signed with TokenAB.

vii. Verifies that the data elements specifying UserB's identity are signed with TokenAB.

e. The individual or entity posing the identity requirement considers that requirement to have been satisfied.

8. Identity_Setup5 Invalidate intermediate certificate a. UserB or TCA2 invalidates UserB's private/public key pair.

9. Identity_Usage4 Invalid intermediate certificate a. A situation arises where both UserA and UserB have become incapacitated.

b. While UserA and UserB are incapacitated, an issue arises with UserA's personal affairs, and UserA's identity mist be asserted to resolve the issue.

c. UserC presents TokenABC to the person or entity posing the identity requirement for UserA.

d. The individual or entity posing the identity requirement:

i. Verifies the identity of UserC.

ii. Attempts to use the public key associated with User-B_ID to validate UserB's signature on TokenABC.

iii. Discovers that UserB's keys have been invalidated.

e. The individual or entity posing the identity requirement rejects UserC's assertion of UserA's identity.

10. Identity_Setup6 Invalidate primary certificate a. UserA or TCA1 invalidates UserA's private/public key pair.

11. Identity_Usage5 Invalid primary certificate a. A situation arises where UserA becomes incapacitated.

b. While UserA is incapacitated, an issue arises with UserA's personal affairs, and UserA's identity must be asserted to resolve the issue.

c. UserB presents TokenAB to the person or entity posing the identity requirement for UserA.

d. The individual or entity posing the identity requirement:

i. Verifies the identity of UserB.

ii. Attempts to use the public key associated with UserA_ID to validate UserA's signature on TokenAB.

iii. Discovers that UserA's keys have been invalidated.

e. The individual or entity posing the identity requirement rejects UserB's assertion of UserA's identity.

Granting power of attorney is a very serious matter. Many varieties exist, such as durable power of attorney, springing power of attorney and health care power of attorney. ESTs make it possible to encode and manage any number of grants for any purpose, through specification of conditions for their usage, including grants regarding the identity of legal entities as well as those for people.

As noted in the overview, UserA is responsible for protecting their own private key, and/or any credentials used to access that private key. If that private key or the credentials for accessing that private key have been compromised, UserA is responsible for taking the steps necessary to invalidate that private key, which in turn will invalidate any signatures applied with it.

Application 2: Propagating Login Credentials

In our modern world an ordinary person can possess an extraordinary number of usernames, passwords and security questions/answers, which all seem destined to be forgotten. Security best practices dictate that we should be random and non-repeating, making matters even more challenging. Thankfully, we can advance from a list in the desk drawer to secure password applications.

Even so, in the course of life we sometimes must share credentials. ESTs combined with encryption facilitate secure, manageable propagation, and—if supported by the applications requiring credentials—can comprise a "something you have" factor of authentication.

Credentials Process:

1. Credentials_Setup1 Establish a login a. A computer service application "Application1" has obtained a private/public key pair that can be used to apply/validate digital signatures and encrypt/decrypt content.

b. Application1 is adapted to support EST business processes.

c. A person or entity "UserA" establishes login credentials (username, password) with Application1.

d. Application1 applies Application1's digital signature to UserA's login credentials.

e. The resulting token "TokenAA" is encrypted with Application1's public key to produce "TokenAAe" and provided to UserA.

f. TokenAAe effectively authorizes UserA to use UserA's login credentials to log into Application1.

2. Credentials_Usage1 Valid login a. UserA attempts a login to Application1 with UserA's login credentials, and provides TokenAAe along with those credentials.

b. Application1:

i. Uses Application1's private key to decrypt TokenAAe to produce TokenAA.

ii. Uses Application1's public key, TokenAA and the login credentials presented to validate that Application1 signed those login credentials.

c. Application1 allows access to UserA.

3. Credentials_Usage2 Invalid login—no token a. UserX attempts a login to Application1 with UserA's login credentials, but does not provide a token along with those credentials.

b. Application1 denies access to UserX and logs the invalid login attempt.

4. Credentials_Usage3 Invalid login—wrong token a. UserX attempts a login to Application 1 with UserA's login credentials, and provides TokenAXe along with those credentials.

b. Application1:

i. Uses Application1's private key to decrypt TokenAXe to produce TokenAX.

ii. Uses Application1's public key, TokenAX and the login credentials presented but cannot validate that Application1 signed those login credentials.

c. Application1 denies access to UserX and logs the invalid login attempt.

5. Credentials_Setup2 Propagate credentials (level 1)

a. UserA has obtained a private/public key pair that can be used to apply/validate digital signatures.

b. UserA shares UserA's credentials with another person or entity that is known to Application', "UserB".

c. UserA applies UserA's digital signature to the combination of:

i. TokenAAe.

ii. One or more data elements specifying the identity of UserB.

d. The resulting signed object "TokenAAB" is tagged with sufficient information "UserA_ID" to identify UserA's public key, encrypted with Application1's public key to produce "TokenAABe", and provided to UserB.

e. TokenAABe effectively authorizes UserB to use UserA's login credentials to log into Application1 as UserA.

6. Credentials_Usage4 Invoke propagated credentials (level 1)
   a. UserB proves UserB's identity with APPLICATION1.
   b. UserB attempts a login to Application1 with UserA's login credentials, and provides TokenAABe along with those credentials.
   c. Application1:
      i. Uses Application1's private key to decrypt TokenAABe to produce TokenAAB.
      ii. Uses the public key associated with UserA_ID to validate UserA's signature on TokenAAB.
      iii. Verifies that data elements specifying the identity of UserB are signed with TokenAAB.
      iv. Verifies that TokenAAe is signed with TokenAAB.
      v. Uses Application1's private key to decrypt TokenAAe to produce TokenAA.
      vi. Uses Application1's public key, TokenAA and the login credentials presented to validate that Application1 signed those credentials.
   d. Application1 allows UserB to log in as UserA.
7. Credentials_Setup3 Propagate credentials with rights (level 1)
   a. In the process of producing TokenAAB, UserA additionally includes data representing "PropagationRights".
   b. TokenAABe thus additionally authorizes UserB to further propagate UserA's credentials to other users.
8. Credentials_Setup4 Propagate credentials (level 2)
   a. UserB has obtained a private/public key pair that can be used to apply/validate digital signatures.
   b. UserB shares UserA's credentials with another person or entity that is known to Application', "UserC".
   c. UserB applies UserB's digital signature to the combination of:
      i. TokenAABe as produced in Credentials_Setup3.
      ii. One or more data elements specifying the identity of UserC.
   d. The resulting signed object "TokenAABC" is tagged with sufficient information "UserB_ID" to identify UserB's public key, encrypted with Application 1's private key to produce "TokenAABCe", and provided to UserC.
9. Credentials_Usage5 Invoke propagated credentials (level 2)
   a. UserC proves UserC's identity with Application1.
   b. UserC attempts a login to Application1 with UserA's login credentials and provides TokenAABCe along with those credentials.
   c. Application1:
      i. Uses Application1's private key to decrypt TokenAABCe to produce TokenAABC.
      ii. Uses the public key associated with UserB_ID to validate UserB's signature on TokenAABC.
      iii. Verifies that data elements specifying the identity of UserC are signed with TokenAABC.
      iv. Verifies that TokenAABe is signed with TokenAABC.
      v. Uses Application1's private key to decrypt TokenAABe to produce TokenAAB.
      vi. Uses the public key associated with UserA_ID to validate UserA's signature on TokenAAB.
      vii. Verifies that data elements specifying the identity of UserB are signed with TokenAAB.
      viii. Verifies that TokenAAe is signed with TokenAAB.
      ix. Uses Application1's private key to decrypt TokenAAe to produce TokenAA.
      x. Uses Application1's public key, TokenAA and the login credentials presented to validate that Application1 signed those credentials.
   d. Application1 allows UserC to log in as UserA.
10. Credentials_Setup5 Level1 token invalidation
    a. UserA invalidates TokenAABe.
11. Credentials_Usage6 Invalid level1 login—invalid level1 token
    a. UserB proves UserB's identity with Application1.
    b. UserB attempts a login to Application1 with UserA's login credentials, and provides TokenAABe along with those credentials.
    c. Application1 recognizes that TokenAABe has been invalidated.
    d. Application1 denies UserB's attempt to log in as UserA, and logs the invalid login attempt.
12. Credentials_Usage7 Invalid level2 login—invalid level1 token
    a. UserC proves UserC's identity with Application1.
    b. UserC attempts a login to Application1 with UserA's login credentials and provides TokenAABCe along with those credentials.
    c. Application1:
       i. Uses Application1's private key to decrypt TokenAABCe to produce TokenAABC.
       ii. Uses the public key associated with UserB_ID to validate UserB's signature on TokenAABC.
       iii. Verifies that data elements specifying the identity of UserC are signed with TokenAABC.
       iv. Recognizes that TokenAABe signed with TokenAABC has been invalidated.
    d. Application1 denies UserC's attempt to log in as UserA, and logs the invalid login attempt.
13. Credentials_Setup6 Core token invalidation
    a. Application1 or UserA invalidates TokenAAe.
    b. UserA establishes a new password.
    c. Application1 generates a new token TokenAAe'.
14. Credentials_Usage8 Invalid login—invalid core token
    a. UserX attempts a login to Application1 with UserA's new login credentials (established in Credentials_Setup6), and provides TokenAAe along with those credentials.
    b. Application1 recognizes that TokenAAe has been invalidated.
    c. Application1 denies access to UserX and logs the invalid login attempt.
15. Credentials_Usage9 Invalid level1 login—invalid core token
    a. UserB proves UserB's identity with Application1.
    b. UserB attempts a login to Application1 with UserA's login credentials, and provides TokenAABe along with those credentials.
    c. Application1:
       i. Uses Application1's private key to decrypt TokenAABe to produce TokenAAB.
       ii. Uses the public key associated with UserA_ID to validate UserA's signature on TokenAAB.
       iii. Verifies that data elements specifying the identity of UserB are signed with TokenAAB.
       iv. Recognizes that TokenAAe signed with TokenAAB has been invalidated
    d. Application1 denies UserC's attempt to log in as UserA, and logs the invalid login attempt Application 3: Propagating an Email Address One key challenge with email is the ease with which email addresses can be shared, or "leaked" to parties that use them for unsolicited marketing purposes, a practice frequently referred to as "spam". Once an unauthorized sender knows an email address, nothing prevents them from sending unsolicited emails or further propagating that address to other unauthorized senders. The burden then rests on the email address owner to identify and purge unwanted emails.

Methods have been created to combat this, such as:

"Spam filters": Methods for identifying spam based on suspicious patterns or keywords used by spammers, which are not always effective at identifying spam and sometimes produce false positives.

"Black lists": Lists of known unauthorized senders, which are purely reactive and don't prevent initial spam attempts or usage of different addresses by unauthorized senders.

"White lists": Lists of known authorized senders, which do not allow legitimate propagation of email addresses and therefore may block legitimate emails as well.

A significant need thus exists for a method that will provide email users with greater control. The method described herein requires more than just an email address to send an email. It further requires that the sender furnish proof of how they obtained an email address. ESTs provide a means to legitimately propagate email addresses beyond a "white list" created by an email user.

Email Process:

1. Email_Setup1 Create email address
  a. An email service "ES1" has obtained a private/public key pair that can be used to apply/validate digital signatures.
  b. ES1 applications are adapted to support EST business processes.
  c. A person or entity "UserA" obtains a new email address from ES1.
  d. ES1 applies ES1's digital signature to UserA's email address.
  e. The resulting token "TokenEA" is provided to UserA.
  f. TokenEA effectively authorizes UserA to control access to UserA's email address.

2. Email_Setup2 Propagate email address (level 1)
  a. UserA has obtained, from a trusted certification authority, a private/public key pair that can be used to apply/validate digital signatures.
  b. UserA applies UserA's digital signature to the combination of:
    i. TokenEA
    ii. UserB's email address as Sender
  c. The resulting signed object, "TokenEAB", is provided to UserB along with UserA's email address, tagged with sufficient information "UserA_ID" to identify UserA's public key, and copied to ES1.
  d. "TokenEAB" thereby effectively authorizes UserB to send email to UserA.

3. Email_Usage1 Valid email (level 1)
  a. UserB sends an email addressed to UserA, and includes TokenEAB with the email.
  b. ES1:
    i. Uses the public key associated with UserA_ID to validate the signature of UserA on TokenEAB.
    ii. Verifies that UserB's email address is signed with TokenEAB as Sender.
    iii. Verifies that TokenEA is signed with TokenEAB.
    iv. Uses ES1's public key to validate the signature of ES1 on TokenEA.
    v. Verifies that UserA's email address is signed with TokenEA.
  c. ES1 delivers UserB's email to UserA.

4. Email_Usage2 Invalid email—no token
  a. UserX sends an email addressed to UserA, and does not include any token.
  b. ES1 rejects the email due to lack of a token.

5. Email_Usage3 Invalid email—wrong level 1 token
  a. UserX sends an email addressed to UserA, and includes TokenEAB with the email.
  b. ES1:
    i. Uses the public key associated with UserA_ID to validate the signature of UserA on TokenEAB.
    ii. Is unable to verify that UserX's email address is signed with TokenEAB as Sender.
  c. ES1 rejects the email due to lack of a valid token, and logs the fact that UserX attempted to use TokenEAB provided to UserB by UserA.

6. Email_Setup3 Propagate email address with rights (level 1—email)
  a. In the process of producing TokenEAB (see Email_Setup2), UserA additionally includes data representing "PropagateEmail".
  b. TokenEAB thus additionally authorizes UserB to further propagate UserA's email address to other users.

7. Email_Setup4 Propagate email address (level 2)
  a. UserB has obtained, from a trusted certification authority, a private/public key pair that can be used to apply/validate digital signatures.
  b. UserB applies UserB's digital signature to the combination of:
    i. TokenEAB, including the tagged information "UserA_ID"
    ii. UserC's email address as Sender
  c. The resulting signed object, "TokenEABC", is provided to UserC along with UserA's email address, tagged with sufficient information "UserB_ID" to identify UserB's public key, and copied to ES1.
  d. "TokenEABC" thereby effectively authorizes UserC to send email to UserA.

8. Email_Usage4 Valid email (level 2)
  a. UserC sends an email addressed to UserA, and includes TokenEABC with the email.
  b. ES1:
    i. Uses the public key associated with UserB_ID to validate the signature of UserB on TokenEABC.
    ii. Verifies that UserC's email address is signed with TokenEABC as Sender.
    iii. Verifies that TokenEAB is signed with TokenEABC.
    iv. Uses the public key associated with UserA_ID to validate the signature of UserA on TokenEAB.
    v. Verifies that UserB's email address is signed with TokenEAB.
    vi. Verifies that data representing "PropagateEmail" is signed with TokenEAB.
    vii. Verifies that TokenEA is signed with TokenEAB.
    viii. Uses ES1's public key to validate the signature of ES1 on TokenEA.
    ix. Verifies that UserA's email address is signed with TokenEA.
  c. ES1 delivers UserC's email to UserA.

9. Email_Usage5 Invalid email—wrong level 2 token
  a. UserX sends an email addressed to UserA, and includes TokenEABC with the email.
  b. ES1:
    i. Uses the public key associated with UserB_ID to validate the signature of UserB on TokenEABC
    ii. Is unable to verify that UserX's email address is signed with TokenEABC as Sender.
  c. ES1 rejects the email due to lack of a valid token, and logs the fact that UserX attempted to use TokenEABC provided to UserC by UserB on behalf of UserA.

10. Email_Setup5 Propagate email address with rights (level 1—prop)
  a. In the process of producing TokenEAB (see Email_Setup2), UserA additionally includes both:
    i. Data representing "PropagateEmail".
    ii. Data representing "PropagateRights".

b. TokenEAB thus additionally authorizes UserB to further propagate UserA's email address to other users, and to further propagate the rights to further propagate UserA's email address to other users.

11. Email_Setup6 Propagate email address with rights (level 2—email)

a. In the process of producing TokenEABC (see Email_Setup4), UserB additionally includes data representing "PropagateEmail".

b. TokenEABC thus additionally authorizes UserC to further propagate UserA's email address to other users.

12. Email_Setup7 Propagate email address (level 3)

a. UserC has obtained, from a trusted certification authority, a private/public key pair that can be used to apply/validate digital signatures.

b. UserC applies UserC's digital signature to:

i. The combination of:
1. TokenEABC, including the tagged information "UserB_ID"
2. UserD's email address as Sender ii. The combination of:
1. TokenEABC, including the tagged information "UserB_ID"
2. UserE's email address as Sender iii. The combination of:
1. TokenEABC, including the tagged information "UserB_ID"
2. UserF's email address as Sender c. The resulting signed objects, "TokenEABCD", "TokenEABCE" and "TokenEABCF" are provided to UserD, UserE and UserF, respectively, and tagged with sufficient information "UserC_ID" to identify UserC's public key, and copied to ES1.

d. TokenEABCD, TokenEABCE and TokenEABCF thereby effectively authorize UserD, UserE and UserF, respectively, to send email to UserA.

13. Email_Usage6 Invalidate level 2 token a. After receiving repeated unwanted emails from UserD, UserE and UserF, UserA uses an ES1 application to invalidate TokenEABC provided to UserC, which further invalidates all tokens produced by UserC, including TokenEABCD, TokenEABCE and TokenEABCF.

b. ES1 subsequently rejects any email sent with TokenEABC

14. Email_Usage7 Invalidate level 1 token a. In response to the log entry generated in Email_Usage3, UserA uses an ES1 application to invalidate TokenEAB provided to UserB, which further invalidates all tokens produced by UserB, including TokenEABC.

b. ES1 subsequently rejects any email sent with TokenEAB.

The process described above can be employed to create a "tree" structure for a specific email address, where each major branch of the tree represents an entity that an email address owner has personally authorized to send email. Sub-branches represent third parties that those entities, in turn, have propagated the email address to, and so on. The email address owner can thus employ this tree structure in the management of their email address, essentially "pruning" those portions of the tree that have result in consistent unwanted email traffic.

The process can also be enhanced to specify additional conditions for propagation of email addresses, such as authorizing a sender to propagate an email address only for the purposes of fulfilling a specific transaction. The process can also be enhanced to support "promotion" of a token to "branch" level for a specific user, such as promoting UserC to branch level by invalidating TokenEABC and producing a new token TokenEAC, signed directly by UserA.

Application 4: Propagating a Telephone Number

While "Do Not Call" lists have provided a much-needed legal framework for limiting telemarketing and other unwanted phone calls, enforcement of these lists requires that telephone users report abuse of these policies, and that the relevant authorities follow through with investigation, litigation and assessment of penalties for abusers.

Telephone users would benefit greatly from a technology that facilitates automatic enforcement of "Do Not Call" designation.

Phone Process:

1. Phone_Setup1 Create phone number a. A telephone service "TS1" has obtained a private/public key pair that can be used to apply/validate digital signatures.

b. TS1 applications are adapted to support EST business processes.

c. A person or entity "UserA" obtains a new telephone number from TS1.

d. TS1 applies TS1's digital signature to UserA's telephone number.

e. The resulting token "TokenTA" is provided to UserA.

f. TokenTA effectively authorizes UserA to control access to UserA's telephone number.

2. Phone_Setup2 Propagate phone number (level 1)

a. UserA has obtained, from a trusted certification authority, a private/public key pair that can be used to apply/validate digital signatures.

b. UserA applies UserA's digital signature to the combination of:

i. TokenTA
ii. UserB's telephone number as Caller c. The resulting signed object, "TokenTAB", is provided to UserB along with UserA's telephone number, tagged with sufficient information "UserA_ID" to identify UserA's public key, and copied to TS1.

d. "TokenTAB" thereby effectively authorizes UserB to call UserA's telephone number.

3. Phone_Usage1 Valid call (level 1)

a. UserB attempts to place a call to UserA, and provides TokenTAB with the telephone transmission.

b. TS1:

i. Uses the public key associated with UserA_ID to validate the signature of UserA on TokenTAB
ii. Verifies that UserB's telephone number is signed with TokenTAB as Caller.
iii. Verifies that TokenTA is signed with TokenTAB.
iv. Uses ES1's public key to validate the signature of ES1 on TokenTA.
v. Verifies that UserA's telephone number is signed with TokenTA.

c. TS1 routes UserB's call through to UserA.

4. Phone_Usage2 Invalid call—no token a. UserX attempts to place a call to UserA, and does not provide any token with the telephone transmission.

b. TS1 blocks the telephone call due to lack of a token.

5. Phone_Usage3 Invalid call—wrong level 1 token a. UserX attempts to place a call to UserA, and provides TokenTAB with the telephone transmission.

b. TS1:

i. Uses the public key associated with UserA_ID to validate the signature of UserA on TokenTAB.
ii. Is unable to verify that UserX's telephone number is signed with TokenTAB as Caller.

c. TS1 blocks the telephone call due to lack of a valid token, and logs the fact that UserX attempted to use TokenTAB provided to UserB by UserA.

6. Phone_Setup3 Propagate phone number with rights (level 1—phone)

a. In the process of producing TokenTAB (see Phone_Setup2), UserA additionally includes data representing "PropagatePhone"

b. TokenTAB thus additionally authorizes UserB to further propagate UserA's telephone number to other users.

7. Phone_Setup4 Propagate phone number (level 2)

a. UserB has obtained, from a trusted certification authority, a private/public key pair that can be used to apply/validate digital signatures.

b. UserB applies UserB's digital signature to the combination of:

i. TokenTAB, including the tagged information "UserA_ID"

ii. UserC's telephone number as Caller c. The resulting signed object, "TokenTABC", is provided to UserC along with UserA's telephone number, tagged with sufficient information "UserB_ID" to identify UserB's public key, and copied to TS1.

d. "TokenTABC" thereby effectively authorizes UserC to call UserA's telephone number.

8. Phone_Usage4 Valid call (level 2)

a. UserC attempts to place a telephone call to UserA, and provides TokenTABC with the telephone transmission.

b. TS1:

i. Uses the public key associated with UserB_ID to validate the signature of UserB on TokenTABC ii. Verifies that UserC's telephone number is signed with TokenTABC as Caller.

iii. Verifies that TokenTAB is signed with TokenTABC.

iv. Uses the public key associated with UserA_ID to validate the signature of UserA on TokenTAB.

v. Verifies that UserB's telephone number is signed with TokenTAB.

vi. Verifies that data representing "PropagatePhone" is signed with TokenTAB.

vii. Verifies that TokenTA is signed with TokenTAB.

viii. Uses ES1's public key to validate the signature of ES1 on TokenTA.

ix. Verifies that UserA's telephone number is signed with TokenTA.

c. TS1 routes UserC's call through to UserA.

9. Phone_Usage5 Invalid call—wrong level 2 token a. UserX attempts to place a telephone call to UserA, and provides TokenTABC with the telephone transmission.

b. TS1:

i. Uses the public key associated with UserB_ID to validate the signature of UserB on TokenTABC ii. Is unable to verify that UserX's telephone number is signed with TokenTABC as Caller.

c. TS1 blocks the telephone call due to lack of a valid token, and logs the fact that UserX attempted to use TokenTABC provided to UserC by UserB on behalf of UserA.

10. Phone_Setup5 Propagate phone number with rights (level 1—prop)

a. In the process of producing TokenTAB (see Phone_Setup1), UserA additionally includes both:

i. Data representing "PropagatePhone".

ii. Data representing "PropagateRights".

b. TokenTAB thus additionally authorizes UserB to further propagate UserA's telephone number to other users, and to further propagate the rights to further propagate UserA's telephone number to other users.

11. Phone_Setup6 Propagate phone number with rights (level 2—phone)

a. In the process of producing TokenTABC (see Phone_Setup4), UserB additionally includes data representing "PropagatePhone".

b. TokenTABC thus additionally authorizes UserC to further propagate UserA's telephone number to other users.

12. Phone_Setup7 Propagate phone number (level 3)

a. UserC has obtained, from a trusted certification authority, a private/public key pair that can be used to apply/validate digital signatures.

b. UserC applies UserC's digital signature to:

i. The combination of:

1. TokenTABC, including the tagged information "UserB_ID"

2. UserD's telephone number as Caller ii. The combination of:

1. TokenTABC, including the tagged information "UserB_ID"

2. UserE's telephone number as Caller iii. The combination of:

1. TokenTABC, including the tagged information "UserB_ID"

2. UserF's telephone number as Caller c. The resulting signed objects, "TokenTABCD", "TokenTABCE" and "TokenTABCF" are provided to UserD, UserE and UserF, respectively, tagged with sufficient information "UserC_ID" to identify UserC's public key, and copied to TS1.

d. TokenTABCD, TokenTABCE and TokenTABCF thereby effectively authorize UserD, UserE and UserF, respectively, to call UserA's telephone number.

13. Phone_Usage6 Invalidate level 2 token a. After receiving repeated unwanted phone calls from UserD, UserE and UserF, UserA uses a TS1 application to invalidate TokenTABC provided to UserC, which further invalidates all tokens produced by UserC, including TokenTABCD, TokenTABCE and TokenTABCF.

b. TS1 subsequently blocks any phone call attempted with TokenTABC.

14. Phone_Usage7 Invalidate level 1 token a. In response to the log entry generated in Phone_Usage3, UserA uses a TS1 application to invalidate TokenTAB provided to UserB, which further invalidates all tokens produced by UserB, including TokenTABC.

b. TS1 subsequently blocks any phone call attempted with TokenTAB.

A tree structure can be used for managing telephone numbers just as described in the email process above.

The process described above can be enhanced by enabling mobile phones to produce tokens through direct physical contact.

Application 5: Propagating a Vote

The proliferation of electronic voting systems, while providing efficiency and ease of use in the voting process, has created many new opportunities for fraud and abuse. A frequent criticism of electronic voting systems is their lack of a physical audit trail. Citizens are concerned, and understandably so, that once their votes have traversed the divide into the digital landscape, they can be manipulated to produce any desired result at the whim of a perpetrator.

This challenge is further exacerbated by the fact that, citing security reasons, voting machine vendors have been unwilling to publish their source code. This field is ripe for a solution to this lack of transparency, where understanding how a voting system works does not provide any advantage to a potential perpetrator.

Voting Process:
1. Vote_Setup1 Voting
   a. A person "UserA" places their votes at a local Polling place.
   b. In the process of placing that vote, UserA applies UserA's digital signature to the combination of:
      i. UserA's votes, consisting of issue/value pairs per ballot item (the functional data elements)
      ii. An identifier for the Polling place
   c. The resulting signed object, "TokenAP", is tagged with sufficient information "UserA_ID" to anonymously identify UserA's public key.
   d. "TokenAP" thereby effectively authorizes the Polling place to propagate UserA's votes to the voting Jurisdiction (precinct) level in the voting structure.
2. Vote_Setup2 Vote propagation to jurisdiction
   a. An authorized Official at UserA's Polling place applies that Official's digital signature to the combination of:
      i. TokenAP, including "UserA_ID"
      ii. An identifier for the voting Jurisdiction (Precinct) to which UserA's Polling place belongs
   b. The resulting signed object, "TokenAPJ", is tagged with sufficient information "POfficial_ID" to identify the public key of the authorized Official at UserA's Polling place.
   c. "TokenAPJ" thereby effectively authorizes the voting Jurisdiction to propagate UserA's votes to the State level in the voting structure.
3. Vote_Setup3 Vote propagation to state
   a. An authorized Official within UserA's voting Jurisdiction applies that Official's digital signature to the combination of:
      i. TokenAPJ, including "POfficial_ID"
      ii. An identifier for the State in which UserA resides
   b. The resulting signed object, "TokenAPJS", is tagged with sufficient information "JOfficial_ID" to identify the public key of the authorized Official for UserA's voting Jurisdiction.
   c. "TokenAPJS" thereby effectively authorizes the State to count UserA's votes at the State level in its accounting for a national election.
4. Vote_Setup4 Vote propagation to national aggregator
   a. An authorized Official for UserA's State applies that Official's digital signature to TokenAPJS, including "JOfficial_ID".
   b. The resulting signed object, "TokenAPJSN", is tagged with sufficient information "SOfficial_ID" to identify the public key of the authorized Official for UserA's State.
   c. "TokenAPJSN" can subsequently be submitted by UserA's State as part of their overall voting tally in a National election.
5. Vote_Usage1 National voting tally verification—paired votes
   a. UserA's State submits voting results for UserA's State to a national elections aggregator, including UserA's votes paired with the corresponding token "TokenAPJSN", and along with votes for all other users in UserA's State, each paired with their respective token.
   b. The national elections aggregator can audit and validate the voting results for UserA's State, by executing the following for each set of votes and their respective paired tokens (described specifically for UserA's votes and token):
      i. The national elections aggregator uses the public key associated with SOfficial_ID to validate the signature on TokenAPJSN, and verifies that TokenAPJSN signs a valid identifier JOfficial_ID and an embedded token.
      ii. The national elections aggregator uses the public key associated with JOfficial_ID to validate the signature on TokenAPJS, and verifies that TokenAPJS signs a valid identifier POfficial_ID, an identifier for the correct State, and an embedded token.
      iii. The national elections aggregator uses the public key associated with POfficial_ID to validate the signature on TokenAPJ, and verifies that TokenAPJ signs a valid identifier UserA_ID, an identifier for the correct Jurisdiction, and an embedded token.
      iv. The national elections aggregator uses the public key associated with UserA_ID to validate the signature on TokenAP, and verifies that the TokenAP signs a set of votes, and an identifier for the correct Polling place.
      v. The national elections aggregator compares the votes within TokenAP to the votes submitted by UserA's State, and verifies that the votes submitted match the votes signed with TokenAP.
6. Vote_Usage2 National voting tally verification—blind audit
   a. As opposed to submitting sets of votes paired with their respective tokens to the national elections aggregator, UserA's State simply submits an overall voting tally to the national elections aggregator, along with a complete set of tokens for the submitted votes, where the number of sets of votes submitted is equal to the number of tokens submitted, and where the voting information is embedded within the signed tokens.
   b. The national elections aggregator validates the overall voting tally for UserA's state by "unwrapping" and validating the contents of each token submitted by UserA's state as described in Vote_Usage1, and then comparing the aggregated results from within the complete set of tokens to the voting tally submitted by UserA's State.
   c. If the aggregated results from within the complete set of tokens submitted by
   UserA's state matches the voting tally submitted by UserA's State, the voting tally is considered valid.
7. Vote_Usage3 National voting tally using tokens
   a. As opposed to submitting a voting tally or sets of votes for UserA's State along with a complete set of tokens for UserA's State, UserA's State simply submits a complete set of tokens to the national elections aggregator, where the voting information is embedded within the signed tokens.
   b. The national elections aggregator uses the complete set of tokens from UserA's state as an actual submission of voting results for UserA's State, and tallies the results for UserA's State by "unwrapping" and validating the contents of each token submitted by UserA's state as described in Vote_Usage1, and aggregating the results from the complete set of tokens.
8. Vote_Usage4 State voting tally verification—blind audit
   a. UserA's State validates its own set of results by:
      i. "Unwrapping" and validating the complete set of tokens submitted by all Jurisdictions within UserA's State as described in 5.b.ii through 5.b.v in Vote_Usage1, including TokenAPJS submitted by UserA's voting Jurisdiction on behalf of UserA.
      ii. Comparing the aggregate results from all tokens submitted by UserA's voting Jurisdiction to the overall voting tally submitted by UserA's voting Jurisdiction.
9. Vote_Usage5 State voting tally using tokens
   a. Voting information is embedded within the signed tokens.
   b. UserA's State tallies its own set of results by "unwrapping" and validating the complete set of tokens submitted by all Jurisdictions within UserA's State as described in 5.b.ii through 5.b.v in Vote_Usage1, including TokenAPJS submitted by UserA's voting Jurisdiction on behalf of UserA.

10. Vote_Usage6 Jurisdiction voting tally verification—blind audit a. UserA's voting Jurisdiction validates its own set of results by:

i. "Unwrapping" and validating the complete set of tokens submitted by all Polling places within UserA's voting Jurisdiction as described in 5.b.iii through 5.b.v in Vote_Usage1, including TokenAPJ submitted by UserA's Polling place on behalf of UserA.

ii. Comparing the aggregate results from all tokens submitted by UserA's Polling place to the overall voting tally submitted by UserA's Polling place.

11. Vote_Usage7 Jurisdiction voting tally using tokens a. Voting information is embedded within the signed tokens.

b. UserA's voting Jurisdiction tallies its own set of results by "unwrapping" the complete set of tokens submitted by all Polling places within UserA's voting Jurisdiction as described in 5.b.iii through 5.b.v in Vote_Usage1, including TokenAPJ submitted by UserA's Polling place on behalf of UserA.

12. Vote_Usage8 Polling place voting tally verification—blind audit a. UserA's voting Polling place validates its own set of results by:

i. "Unwrapping" and validating the complete set of tokens generated for all users within UserA's Polling place as described in 5.b.iv through 5.b.v in Vote_Usage1, including TokenAP generated on behalf of UserA.

ii. Comparing the results from each token generated to each set of votes tallied.

13. Vote_Usage9 Polling place voting tally using tokens a. Voting information is embedded within the signed tokens.

b. UserA's Polling place tallies its own set of results by "unwrapping" and validating the complete set of tokens generated for all users within UserA's Polling place as described in 5.b.iv through 5.b.v in Vote_Usage1, including TokenAP generated on behalf of UserA.

14. Vote_Usage10 State tally invalidation by national aggregator a. Voting information is embedded within the signed tokens.

b. A national elections aggregator invalidates the results from UserA's State based on a mismatch between the overall voting tally submitted by UserA's State and the aggregate content of the complete set of tokens submitted by UserA's State.

15. Vote_Usage11 Jurisdiction tally invalidation by state a. Voting information is embedded within the signed tokens.

b. UserA's State invalidates the results from UserA's voting Jurisdiction based on a mismatch between the overall voting tally submitted by UserA's voting Jurisdiction and the aggregate content of the complete set of tokens submitted by UserA's voting Jurisdiction.

16. Vote_Usage12 Polling place tally invalidation by jurisdiction a. Voting information is embedded within the signed tokens.

b. UserA's voting Jurisdiction invalidates the results from UserA's Polling place based on a mismatch between the overall voting tally submitted by UserA's Polling place and the aggregate content of the complete set of tokens submitted by UserA's Polling place.

17. Vote_Usage13 Polling place self-audit and individual vote invalidation a. UserA's Polling place invalidates the results for UserA based on a mismatch between the votes submitted for UserA and the content of UserA's paired token.

18. Vote_Usage13 Polling place self-audit and individual vote correction a. UserA's Polling place makes a correction to the set of votes submitted for UserA based on the content of UserA's paired token.

19. Vote_Usage14 Token audit as basis for institutional litigation a. UserA's Polling place, voting Jurisdiction or State initiates litigation based the content of signed tokens compared to inaccurate results submitted by the authorized Polling place Official (identified by POfficial_ID), the authorized voting Jurisdiction Official (identified by JOfficial_ID) or the authorized State Official (identified by SOfficial_ID), respectively.

20. Vote_Usage15 Token audit as basis for individual litigation a. UserA's Polling place, voting Jurisdiction or State initiates litigation based on invalid tokens submitted by the authorized Polling place Official (identified by POfficial_ID), the authorized voting Jurisdiction Official (identified by JOfficial_ID) or the authorized State Official (identified by SOfficial_ID), respectively.

21. Vote_Setup5 Voting results database creation a. Voting information is embedded within the signed tokens.

b. One or more of the tokens TokenAP, TokenAPJ, TokenAPJS and TokenAPJSN generated on behalf of UserA are tagged with a sufficiently anonymous identifier for UserA.

c. The sufficiently anonymous identifier for UserA is made available to UserA exclusively, along with a means to maintain the security of the sufficiently anonymous identifier for UserA.

d. An elections aggregator at one or more of the Polling place level, the voting Jurisdiction level, the State level or the national level make a voting database application available to voters.

22. Vote_Usage16 Voting results database access a. UserA accesses the voting database application made available to voters by the Polling place, the voting Jurisdiction, the State or a national elections aggregator.

b. UserA provides the sufficiently anonymous identifier for UserA to the voting database application.

c. The voting database application enables UserA to access, "unwrap" and validate, as described in Vote_Usage1, TokenAP, TokenAPJ, TokenAPJS or TokenAPJSN, and thereby to personally validate UserA's votes.

The process described above therefore provides a means to validate, at any level from the individual voter to a national aggregator, the content of every single vote. It also prevents tampering with votes by virtue of the digital signatures applied at every step of the process, as well as providing a means to identify very precisely the level at which any vote may have been tampered with, or the level at which voting tallies may have been misrepresented. The tokens described herein can be leveraged either as an audit mechanism for voting results, or even as the voting results themselves.

It is unacceptable for advanced technologies to be made available only to those who tally and aggregate votes from electronic voting systems, leaving individual citizens to wonder what has become of their precious votes. The process described above puts voters back in full control of their own votes, and provides robust transparency mechanisms for electronic voting systems. The same advanced user authentication and privacy controls that have become ubiquitous for other e-commerce applications can be leveraged for user authentication and privacy in the voting process.

The process described above can be further enhanced by incorporating and encrypting voter registration information in the core of the EST token, where UserA's votes and an identifier for UserA's polling place would be signed in combination with a token containing that voter registration information. This enhancement would further strengthen the process by preventing voter fraud in addition to preventing vote tampering.

Application 6: Propagating a Credit Card Number

Nearly every time we use a credit card, we entrust another person or entity to invoke our credit card information to complete a transaction. When filling out an online form or sharing a credit card number over the phone, we are entrusting that information to another party, and assuming they will use it responsibly. Incidents of "skimming" occur periodically, where an individual entrusted with these details will copy it somehow, to be used later for their own illicit purposes. For these situations it would be beneficial to provide that information in a way that limits its usage.

Even if those parties were entirely trustworthy, many other cases exist where an individual will entrust their credit card information to a child, a personal assistant or a colleague to invoke it either on their behalf or with their permission. Though a sufficient level of trust exists at the time the information is shared, there is never any guarantee that the same level of trust will always exist; however, once the information has been shared there is no way to take it back.

A means to share credit card information so that its usage is appropriately limited, and where the ability to invoke it could be rescinded if necessary, would provide a great deal of value to a credit card holder.

Credit Card Process:

1. Card_Setup1 Create new credit card
   a. A credit card provider "CC1" has obtained a private/public key pair that can be used to apply/validate digital signatures.
   b. CC1 applications are adapted to support EST business processes.
   c. A person or entity "UserA" acquires a new credit card from CC1.
   d. CC1 applies CC1's digital signature to the combination of:
      i. UserA's new credit card information (credit card number, expiration date and security code).
      ii. One or more data elements specifying UserA's identity.
   e. The resulting signed object, "TokenCCA", is provided to UserA.
   f. TokenCCA effectively authorizes UserA to control usage of UserA's new credit card.

2. Card_Setup2 Propagate credit card info (level 1)
   a. UserA has obtained, from a trusted certification authority, a private/public key pair that can be used to apply/validate digital signatures.
   b. UserA applies UserA's digital signature to the combination of:
      i. TokenCCA
      ii. A set of one or more data elements specifying the identity of another person or entity, UserB.
      iii. Zero or more conditions limiting UserB's usage of the credit card number.
   c. The resulting signed object, "TokenCCAB", is provided to UserB along with the credit card information, tagged with sufficient information "UserA_ID" to identify UserA's public key, and copied to CC1.
   d. "TokenCCAB" thereby effectively authorizes UserB to make a purchase with UserA's new credit card.

3. Card_Usage1 Valid purchase (level 1)
   a. UserB attempts to make a purchase with UserA's credit card, and provides TokenCCAB along with UserA's credit card information.
   b. The vendor, in coordination with CC1:
      i. Verifies UserB's identity.
      ii. Uses the public key associated with UserA_ID to validate the signature of UserA on TokenCCAB
      iii. Verifies that data elements specifying UserB's identity are signed with TokenCCAB
      iv. Verifies that the purchase attempted by UserB does not violate any conditions signed with TokenCCAB limiting UserB's usage of the credit card.
      v. Verifies that TokenCCA is signed with TokenCCAB.
      vi. Uses CC1's public key to validate the signature of CC1 on TokenCCA.
      vii. Verifies that the information for the credit card presented by UserB is signed with TokenCCA.
   c. The vendor, in coordination with CC1, approves the purchase.

4. Card_Usage2 Invalid purchase—no token
   a. UserX attempts to make a purchase with UserA's credit card, but provides no token along with UserA's credit card information.
   b. The vendor, in coordination with CC1, denies the purchase based on the absence of a token.

5. Card_Usage3 Invalid purchase—wrong level 1 token
   a. UserX attempts to make a purchase with UserA's credit card, and provides TokenCCAB along with UserA's credit card information.
   b. The vendor, in coordination with CC1:
      i. Verifies UserX's identity
      ii. Uses the public key associated with UserA_ID to validate the signature of UserA on TokenCCAB.
      iii. Is unable to verify that data elements specifying UserX's identity are signed with TokenCCAB.
   c. The vendor, in coordination with CC1, denies the purchase.

6. Card_Setup3 Maximum purchase condition
   a. During the process described in Card_Setup1, UserA specifies a condition limiting individual purchases to $100.
   b. TokenCCAB thus limits UserB's authorization to use UserA's credit card to a maximum purchase value of $100.

7. Card_Usage4 Invalid purchase—exceeds maximum
   a. UserB attempts to make a $200 purchase with UserA's credit card, and provides TokenCCAB along with UserA's credit card information.
   b. The vendor, in coordination with CC1:
      i. Verifies UserB's identity.
      ii. Uses the public key associated with UserA_ID to validate the signature of UserA on TokenCCAB
      iii. Verifies that data elements specifying UserB's identity are signed with TokenCCAB
      iv. Is unable to verify that the purchase attempted by UserB does not violate any conditions signed with TokenCCAB limiting UserB's usage of the credit card.
   c. The vendor, in coordination with CC1, denies the purchase.

8. Card_Setup4 Propagate credit card info with rights (level 1)
   a. In the process of producing TokenCCAB (see Card_Setup2), UserA additionally includes data representing "PropagateCardInfo".
   b. TokenCCAB thus additionally authorizes UserB to further propagate UserA's credit card information to other people or entities as required to execute purchases.
9. Card_Usage5 Propagating credit card info (level 2)
   a. UserB has obtained, from a trusted certification authority, a private/public key pair that can be used to apply/validate digital signatures.
   a. When invoking UserA's credit card information to make a purchase, UserB:
      i. Provides sufficient information to a vendor "UserC" for UserC to verify UserB's identity
      ii. Applies UserB's digital signature to the combination of:
         1. TokenCCAB, including the information "UserA_ID"
         2. A set of one or more data elements specifying the identity of UserC.
         3. Conditions limiting UserC's usage of the credit card information to the specific purchase being requested.
   b. The resulting signed object, "TokenCCABC", is provided to UserC, tagged with sufficient information "UserB_ID" to identify UserB's public key, and copied to CC1.
   c. TokenCCABC thereby effectively authorizes UserC to process a purchase with UserA's credit card information.
10. Card_Usage6 Valid purchase (level 2)
    a. In order to process the purchase for UserB, UserC presents the credit card information, the purchase information and TokenCCABC to CC1.
    b. CC1:
       i. Verifies UserC's identity
       ii. Uses the public key associated with UserB_ID to validate the signature of UserB on TokenCCABC.
       iii. Verifies that data elements specifying UserC's identity are signed with TokenCCABC.
       iv. Verifies that the purchase attempted by UserC does not violate any conditions signed with TokenCCABC limiting UserC's usage of the credit card information.
       v. Verifies that TokenCCAB is signed with TokenCCABC.
       vi. Uses the public key associated with UserA_ID to validate the signature of UserA on TokenCCAB.
       vii. Verifies that data elements specifying UserB's identity are signed with TokenCCAB.
       viii. Verifies that data representing "PropagateCardInfo" is signed with TokenCCAB.
       ix. Verifies that the purchase attempted by UserC does not violate any conditions signed with TokenCCAB limiting UserB's usage of the credit card.
       x. Verifies that TokenCCA is signed with TokenCCAB.
       xi. Uses CC1's public key to validate the signature of CC1 on TokenCCA.
       xii. Verifies that the information for the credit card presented by UserC is signed with TokenCCA.
    c. CC1 approves the purchase.
11. Card_Usage7 Invalid purchase—violates condition (level 2)
    a. UserC attempts to process an additional purchase not explicitly requested by UserB, and presents the credit card information, the purchase information and TokenCCABC to CC1.
    b. CC1:
       i. Verifies UserC's identity
       ii. Uses the public key associated with UserB_ID to validate the signature of UserB on TokenCCABC.
       iii. Verifies that data elements specifying UserC's identity are signed with TokenCCABC.
       iv. Is unable to verify that the purchase attempted by UserC does not violate any conditions signed with TokenCCABC limiting UserC's usage of the credit card information.
    c. CC1 rejects the purchase.
12. Card_Setup5 Invalidate level 1 token
    a. UserA uses a CC1 application to invalidate TokenCCAB, effectively terminating UserB's rights to invoke UserA's credit card information when making a purchase.
13. Card_Usage8 Invalid purchase—invalidated token
    a. UserB attempts to make a purchase with UserA's credit card, and provides TokenCCAB along with UserA's credit card information.
    b. The vendor, in coordination with CC1:
       i. Verifies UserB's identity
       ii. Discovers that TokenCCAB has been invalidated by UserA.
    c. The vendor, in coordination with CC1, denies the purchase.

Application 7: Propagating Digital Content

Original digital content can take many forms, from music and creative writing to digital images and motion pictures. Those loftier forms of original content can demand hefty sums if they reach a pinnacle of popularity.

On the flip side, inadvertent, mundane digital content "publishing" is similarly fraught with challenges for the content originator. Users are frequently unaware that their posting of content to social media sites gives those sites broad access and rights to that content—facts that only become readily obvious when you read all of the fine print.

A new model is sorely needed, where someone sharing original content online can maintain some degree of control over who can access and distribute that content, and for what purposes they can do so. ESTs can support models that achieve this, either through collaboration with an established publishing entity, or even through the innovative distribution network of a lone crafty individual.

Digital Content Process:
1. Content_Setup1 Publish digital content
   a. A person or entity "UserA" produces original digital content "ContentA".
   b. One or more publishing applications or devices that provide access to digital content are adapted to require presentation of valid ESTs to access specific, corresponding content objects.
   c. UserA selects one such publishing application or device "PAD1", and possibly others as well, through which to publish ContentA.
   d. UserA and PAD1 have each obtained a private/public key pair that can be used to apply/validate digital signatures and encrypt/decrypt content.
   e. UserA applies UserA's digital signature to the combination of:
      i. ContentA (the functional data element), encrypted with PAD1's public key to produce ContentAe.
      ii. One or more data elements specifying the identity of PAD1.
      iii. Conditions limiting PAD1's distribution of ContentA, including:
         1. Access to ContentA without propagation rights is free but subject to termination at any time.
         2. Access to ContentA with propagation rights is $2, of which UserA must receive $1, but guarantees that the purchaser's token to access ContentA will never be invalidated, or if so will be replaced with another token.

f. The resulting token "TokenAP" is tagged with sufficient information to identify UserA's public key, and provided to PAD1.

g. TokenAPe effectively authorizes PAD1 to distribute ContentA on behalf of UserA within the scope of the conditions specified.

2. Content_Setup2 Level 1 content licensing a. PAD1 offers ContentA to an audience of potential consumers, including another person or entity, UserB, who requests free access to ContentA.

b. PAD1 applies PAD1's digital signature to the combination of:

i. TokenAP ii. One or more data elements specifying the identity of UserB.

iii. A condition prohibiting UserB from making copies of ContentA.

c. The resulting signed object "TokenAPB", is tagged with sufficient information "PAD1_ID" to identify PAD1's public key, provided to UserB, and copied to UserA.

d. TokenAPB thereby effectively authorizes UserB to access and use ContentA within the scope of the conditions specified.

3. Content_Usage1 Level 1 content access a. UserB attempts to access ContentA via an adapted application or device supported by PAD1, and provides TokenAPB including ContentAe.

b. PAD1:

i. Validates the identity of UserB.

ii. Uses the public key associated with PAD1_ID to validate the signature of PAD1 on TokenAPB.

iii. Verifies that data elements specifying the identity of UserB are signed with TokenAPB.

iv. Verifies that the attempted operation is permitted by conditions signed with TokenAPB.

v. Verifies that TokenAP is signed with TokenAPB.

vi. Uses the public key associated with UserA_ID to validate the signature of
UserA on TokenAP.

vii. Verifies that data elements specifying the identity of PAD1 are signed with TokenAP.

viii. Verifies that ContentAe is signed with TokenAP.

ix. Decrypts ContentAe with PAD1's private key.

c. PAD1 provides UserB with access to ContentA.

4. Content_Usage2 Level 1 content operation denied a. UserB attempts to copy or distribute ContentA via an adapted application or device supported by PAD1, and provides TokenAPB including ContentAe.

b. PAD1:

i. Validates the identity of UserB ii. Uses the public key associated with PAD1_ID to validate the signature of PAD1 on TokenAPB.

iii. Verifies that data elements specifying the identity of UserB are signed with TokenAPB.

iv. Cannot verify that the attempted operation is permitted by conditions signed with TokenAPB.

c. PAD1 does not allow UserB to copy or distribute ContentA.

5. Content_Setup2 Level 1 content licensing with rights a. UserB requests access to ContentA with distribution rights.

b. PAD1 applies PAD1's digital signature to the combination of:

i. TokenAP.

ii. One or more data elements specifying the identity of UserB.

iii. Data representing "PropagateContent".

iv. Conditions limiting UserB's distribution of ContentA, including:

1. Access to ContentA without propagation rights is free.

v. Access to ContentA with propagation rights is $2, of which UserA must receive $1 and PAD1 must receive $0.50.

c. The resulting token "TokenAPB" is tagged with sufficient information "PAD1_ID" to identify PAD1's public key, provided to UserB, and copied to UserA.

d. TokenAPB effectively authorizes UserB to propagate ContentA within the scope of the conditions specified.

6. Content_Setup3 Level 2 content propagation a. UserB has obtained a private/public key pair that can be used to apply/validate digital signatures.

b. UserB offers ContentA to an audience of potential consumers, including another person or entity, UserC, who requests free access to ContentA.

c. UserB applies UserB's digital signature to the combination of:

i. TokenAPB ii. One or more data elements specifying the identity of UserC.

iii. A condition prohibiting UserC from making copies of ContentA.

d. The resulting signed object "TokenAPBC" is tagged with sufficient information "UserB_ID" to identify UserB's public key, provided to UserC, and copied to PAD1 and UserA.

e. TokenAPBC thereby effectively authorizes UserC to access and use ContentA within the scope of the conditions specified.

7. Content_Usage3 Level 2 content access a. UserC attempts to access ContentA via an adapted application or device supported by PAD1, and provides TokenAPBC including ContentAe.

b. PAD1:

i. Validates the identity of UserC.

ii. Uses the public key associated with UserB_ID to validate the digital signature of UserB on TokenAPBC.

iii. Verifies that data elements specifying the identity of UserC are signed with TokenAPBC.

iv. Verifies that the attempted operation is permitted by conditions signed with TokenAPBC.

v. Verifies that TokenAPB is signed with TokenAPBC.

vi. Uses the public key associated with PAD1_ID to validate the signature of PAD1 on TokenAPB.

vii. Verifies that data elements specifying the identity of UserB are signed with TokenAPB.

viii. Verifies that data representing "PropagateContent" are signed with TokenAPB.

ix. Verifies that the distribution is permitted within the scope of the conditions signed with TokenAPB.

x. Verifies that TokenAP is signed with TokenAPB.

xi. Uses the public key associated with UserA_ID to validate the signature of UserA on TokenAP.

xii. Verifies that data elements specifying the identity of PAD1 are signed with TokenAP.

xiii. Verifies that ContentAe is signed with TokenAP.

xiv. Decrypts ContentAe with PAD1's private key.

c. PAD1 provides UserB with access to ContentA.

8. Content_Usage4 Level 2 content operation denied a. UserC attempts to copy or distribute ContentA via an adapted application or device supported by PAD1, and provides TokenAPBC including ContentAe.

b. PAD1:

i. Validates the identity of UserC.

ii. Uses the public key associated with UserB_ID to validate the signature of UserB on TokenAPBC.

iii. Verifies that data elements specifying the identity of UserC are signed with TokenAPB.

iv. Is unable to verify that the attempted operation is permitted by conditions signed with TokenAPBC.

c. PAD1 does not allow UserC to copy or distribute ContentA.

9. Content_Usage4 Level 2 content access denied—wrong token a. UserX attempts to access ContentA via an adapted application or device supported by PAD1, and provides TokenAPBC including ContentAe.

b. PAD1:

i. Validates the identity of UserX.

ii. Uses the public key associated with UserB_ID to validate the signature of UserB on TokenAPBC.

iii. Is unable to verify that data elements specifying the identity of UserX are signed with TokenAPB.

c. PAD1 denies UserX access to ContentA.

10. Content_Usage5 Content access denied—no token a. UserX attempts to access ContentA via an adapted application or device supported by PAD1, but provides no token.

b. PAD1 denies UserX access to ContentA.

The foundation of a creative business venture can be imagined with the example application described above. UserA could include in its conditions that if PAD1 were to distribute propagation rights without paying UserA's $1 share, its EST token can be invalidated, and any level 2 "paying customers" promoted to level 1. The same rule could apply at all levels for abuses of the business model. UserA could, with the cooperation of its trusted certification authority, ascertain usage through tracking of signature verifications.

While ensuring that conditions for a publishing application or device may still benefit from sound legal advice, ESTs can put content creators in control of their original content and enable them to contemplate whatever business model they think their customers will consider a fair deal.

EST tokens can also facilitate privacy protection and selective distribution for original content, for example when published through a social media site. Never again could a privacy policy change legitimately allow access to your original content that you had previously restricted.

Application 8: Propagating a Bank Account Identifier

Financial transactions often involve many different participants, each of whom is expected to operate with integrity and accuracy. Further, in our ever-evolving financial landscape, some financial transactions involve entrusting precious resources to third party service organizations, again with the expectation that all participants will invariably "do the right thing".

For large investors, financial transactions of sufficient magnitude challenge the notion of institutional trust. No amount of institutional trust, for example, may be sufficient when a $100 M money movement is in play. In a very specific example, regarding a SWIFT (Society for Worldwide Interbank Financial Telecommunications) message instructing a transfer of $100 M from an account a Bank A to an account at Bank B, there may be no way to guarantee the Bank B "destination" of that transfer other than through the integrity of the message creator, which in some cases will be a third party service organization.

This liability does not end with the integrity of the third party service organization with regards to the task at hand. The bank account owner opens itself up to any technological vulnerability in that service organization This poses a serious challenge for those who entrust a third party organization with their resources. Bank account holders large and small can leverage ESTs to protect their financial transactions by controlling and managing the propagation of authorization to use those accounts. The example below describes only one narrow set of cases and uses for ESTs in managing authorization to use a bank account.

Bank Account Process:

1. Bank_Setup1 Create new bank account a. A financial institution "F1" has obtained a private/public key pair that can be used to apply/validate digital signatures.

b. F1 applications are adapted to support EST business processes.

c. A user "UserA" opens a new bank account with F1.

d. F1 applies F1's digital signature to the combination of:

i. UserA's new bank account number "AccountID1".

ii. One or more data elements specifying F1's identity.

iii. One or more data elements specifying UserA's identity.

e. The resulting signed object, "TokenFA", is provided to UserA.

f. TokenFA effectively authorizes UserA to control usage of UserA's new bank account.

2. Bank_Setup2 Propagate bank account info (level 1)

a. UserA has obtained, from a trusted certification authority, a private/public key pair that can be used to apply/validate digital signatures.

b. UserA applies UserA's digital signature to the combination of:

i. TokenFA ii. A set of one or more data elements specifying the identity of another person or entity, UserB.

iii. An identifier for another bank account, "Account_ID2" designated as a "destination account"

c. The resulting signed object, "TokenFAB", is provided to UserB, tagged with sufficient information "UserA_ID" to identify UserA's public key, and copied to F1.

d. "TokenFAB" thereby effectively authorizes UserB to transfer funds from Account_ID1 to Account_ID2.

3. Bank_Setup3 Propagate bank account info (level 2)

a. UserB has obtained, from a trusted certification authority, a private/public key pair that can be used to apply/validate digital signatures.

b. UserB applies UserB's digital signature to the combination of:

i. TokenFAB ii. A set of one or more data elements specifying the identity of another person or entity, UserC.

iii. An identifier for a trading account "TA_ID1" serviced by UserC, under which TokenFAB may be invoked for settlement purposes.

c. The resulting signed object, "TokenFABC", is provided to UserC, tagged with sufficient information "UserB_ID" to identify UserB's public key, and copied to F1.

d. "TokenFABC" thereby effectively authorizes UserC to transfer funds from Account_ID1 to Account_ID2 to settle a transaction executed for trading account TA_ID1.

4. Bank_Usage1 Valid transfer (level 2)

a. UserC attempts to transfer funds from Account_ID1 to Account_ID2 to settle a purchase under trading account "TA_ID1", and provides TokenFABC to F1, along with those account identifiers.

b. F1:
i. Verifies UserC's identity
ii. Uses the public key associated with UserB_ID to validate the signature of UserB on TokenFABC.
iii. Verifies that data elements specifying the identity of UserC are signed with TokenFABC.
iv. Verifies that the trading account TA_ID1 is signed with TokenFABC.
v. Verifies that TokenFAB is signed with TokenFABC.
vi. Uses the public key associated with UserA_ID to validate the signature of UserA on TokenFAB.
vii. Verifies that data elements specifying the identity of UserB are signed with TokenFAB.
viii. Verifies that Account_ID2 is signed with TokenFAB as a "destination account"
ix. Verifies that TokenFA is signed with TokenFAB.
x. Uses F1's public key to validate the signature of F1 on TokenFA.
xi. Verifies that data elements specifying the identity of UserA are signed with TokenFA.
xii. Verifies that Account_ID1 and one or more data elements specifying the identity of F1 are signed with TokenFA as the "source account".
c. F1 allows UserC's invocation of Account_ID1.
5. Bank_Usage2 Invalid transfer—invalid destination account
a. UserC attempts to transfer funds from Account_ID1 to Account_ID3 to settle a purchase under trading account "TA_ID1", and provides TokenFABC to F1, along with those account identifiers.
b. F1:
i. Verifies UserC's identity
ii. Uses the public key associated with UserB_ID to validate the signature of UserB on TokenFABC.
iii. Verifies that data elements specifying the identity of UserC are signed with TokenFABC.
iv. Verifies that the trading account TA_ID1 is signed with TokenFABC.
v. Verifies that TokenFAB is signed with TokenFABC.
vi. Uses the public key associated with UserA_ID to validate the signature of UserA on TokenFAB.
vii. Verifies that data elements specifying the identity of UserB are signed with TokenFAB.
viii. Is unable to verify that Account_ID3 is signed with TokenFAB as a "destination account" c. F1 rejects UserC's invocation of Account_ID1.
6. Bank_Usage2 Invalid transfer—invalid trading account
a. UserC attempts to transfer funds from Account_ID1 to Account_ID2 to settle a purchase under trading account "TA.sub.—02", and provides TokenFABC to F1, along with those account identifiers.
b. F1:
i. Verifies UserC's identity
ii. Uses the public key associated with UserB_ID to validate the signature of UserB on TokenFABC.
iii. Verifies that data elements specifying the identity of UserC are signed with TokenFABC.
iv. Is unable to verify that the trading account TA_ID2 is signed with TokenFABC.
c. F1 rejects UserC's invocation of Account_ID1.
7. Bank_Setup4 Record a transaction
a. UserC has obtained, from a trusted certification authority, a private/public key pair that can be used to apply/validate digital signatures.
b. As part of the transaction approved in Bank_Usaget User C applies UserC's digital signature to the combination of:

i. TokenFABC
ii. The amount and date of the transfer to be executed between Account_ID1 and Account_ID2.
c. The resulting signed object, "TokenFABCT", is provided to the owner and/or custodian of Account_ID2, tagged with sufficient information "UserC_ID" to identify UserC's public key, and copied to F1.
i. "TokenFABCT" thereby effectively authorizes the owner and/or custodian of Account_ID2 to possess and use the cash transferred in the approved transaction.

As demonstrated in the example above, an EST token can provide unprecedented security for an individual transaction by encoding the various attributes of that transaction within multiple EST layers that were signed over a series of distinct business events. In the example provided, the source account was signed by one entity, the destination account by another entity, and a trading account by yet another entity.

Application 9: Propagating a Cash Investment

Modern financial institutions offer access to a broad array of investment portfolios which are actively managed on behalf of investors, such as money market funds. Diversification of an investor's cash across a number of tracked investments can balance riskier investments with more stable investments—providing some potential upside without endangering the investor's cash position.

Regardless, some portfolio managers are better than others, and when a portfolio manager invests a fund's proceeds in another monetary instrument, the quality of management at that next level of investment also comes into play. In some cases, an original investor's cash could be fragmented even further, being spread across any number of sub-investments or sub-classifications until you finally arrive at a point where cash is tendered for tangible products and services.

Investors in money market funds are very unlikely to be able to trace their cash all the way to these "terminal investments" where cash is tendered for products and services. Only recently have fund managers been required to disclose one level of transparency. The idea of tracking it beyond that seems an impossible accounting nightmare.

ESTs can make it possible. With sufficient adaptation of systems to faithfully record the propagation of cash, it can be accomplished through regular feedback regarding processing of EST tokens. ESTs can also help to enable real-time asset value tracking for a broad category of investments that has traditionally reported asset value on a daily basis only.

Propagating authorization to use cash is possible to the extent that individual units of monetary value can be digitally encoded—not a stretch at all in this day and age. To be sure, tracking the true value of a "cash propagation tree" has its own challenges—not the least of which is achieving participation down to all the various twigs. Regardless, ESTs provide a consistent, reliable structure upon which to contemplate this daunting task, and which can be built out ever further as participation improves.

Cash Process:
1. Cash_Setup1 Service provider setup
a. A financial product "FP1" managed by financial institution "F1" is adapted to use ESTs.
b. F1/FP1 has obtained a private/public key pair that can be used to apply/validate digital signatures.
2. Cash_Setup2 Initial investment
a. An investor "InvestorA" has obtained a private/public key pair that can be used to apply/validate digital signatures.
b. InvestorA:
i. Establishes an investment account with F1.
ii. Contracts to invest $50 M in FP1 (level 1 investment).

iii. Applies InvestorA's digital signature to the combination of:
1. Data specifying the date, the investment account and the amount of the investment.
2. One or more elements specifying the identity of FP1.
c. The resulting signed object "TokenAF" is tagged with sufficient information "InvestorA_ID" to identify InvestorA's public key, and provided to F1 along with $50 M cash.
d. TokenAF effectively authorizes F1 to re-invest InvestorA's $50 M.
3. Cash_Setup3 Portfolio modeling
a. F1 adds InvestorA's $50 M to the total assets available to FP1, which already included another $900 M from other investors.
b. F1 remodels its investment allocation for a total asset value of $950 M, and calculates InvestorA's pro rata share of each level 2 investment in the model, along with the pro rata shares of all other FP1 investors.
c. F1 repeats this modeling process with every subsequent investor purchase and redemption, the total asset value for FP1 reaches $1 B, and InvestorA's pro-rata share for each level 2 investment is calculated as 5%.
4. Cash_Setup4 Portfolio investment
a. At a predetermined interval (e.g. hourly or twice daily), F1 executes on its most current investment allocation model, by:
i. Identifying all differences in each investor's share of each investment in the portfolio, between:
1. The last actual investment allocation at $900 M.
2. The latest modeled investment allocation at $1 B.
ii. Invalidating all ESTs issued upon prior execution of the last investment allocation model, as needed.
Note: If a first-level investor's pro-rata share in a second-level investment does not change, an EST need not be invalidated.
iii. Generating new ESTs for the latest investment allocation model, including a set of ESTs for InvestorA.
b. For InvestorA, and for level 2 (for InvestorA) investment "FP1.25" (the 25.sup.th investment in the FP1 portfolio), F1:
i. Applies F1's digital signature to the combination of:
1. TokenAF
2. One or more data elements specifying the identity of FP1.25.
3. Data representing the date[, investment account] and amount (at 5%, or $500K, of the modeled allocation for FP1.25 at $10 M) of F1's investment in FP1.25 on behalf of InvestorA.
ii. Tags the resulting token "TokenAF.25A" with sufficient information to identify FP1's public key.
iii. Provides TokenAF.25A, along with EST tokens for all other FP1 investors, and $10 M in cash, to the sponsor of FP1.25.
iv. Provides a copy of TokenAF.25A to InvestorA.
c. F1 repeats this token generation process for InvestorA, and for all other FP1 investors, for each investment in the FP1 portfolio.
5. Cash_Setup5 Investment distribution modeling
a. The sponsor of FP1.25 adds FP1's $10 M, including InvestorA's $500K, to the total assets available to FP1.25, which already included $40 M from other sources.
b. FP1.25 models its investment distributions based on a total invested value of $50 M, and calculates FP1's pro rata share for each distinct distribution, and further calculates InvestorA's pro rata share (calculated as 1%) for each distinct level 3 distribution, along with the pro rata shares for all investors for which FP1.25 received EST tokens.

6. Cash_Setup6 Investment distribution
a. The sponsor of FP1.25 has obtained a private/public key pair that can be used to apply/validate digital signatures.
b. FP1.25 executes on its investment distribution model, by:
i. Identifying all differences in each investor's share of each distribution, between:
1. The last prior distribution at $40 M.
2. The latest investment distribution model at $50 M.
ii. Invalidating all ESTs issued upon prior execution of the last investment distribution model, as needed.
iii. Generating a new set of ESTs for the latest investment distribution model.
c. For InvestorA, and for the level 3 (for InvestorA) distribution "FP1.25.E" (the 5.sup.th distribution in the FP1.25 distribution model), the sponsor of FP1.25:
i. Applies the sponsor of FP1.25's digital signature to the combination of:
1. TokenAF.25A
2. One or more data elements specifying the identity of FP1.25.E.
3. Data representing the date, type and amount (at 1%, or $800, of the modeled allocation for FP1.25.E at $80K) of the sponsor of FP1.25's investment in FP1.25.E on behalf of InvestorA.
ii. Tags the resulting token "TokenAF.25A.EA" with sufficient information to identify the sponsor of FP1.25's public key.
iii. Provides TokenAF.25A.EA, along with EST tokens for all other FP1.25 investors, to the administrator of FP1.25.E.
iv. Provides a copy of TokenAF.25A.EA to InvestorA.
d. The sponsor of FP1.25 repeats this token generation process for InvestorA, and for all other FP1.25 investors, for each distinct distribution in the FP1.25 distribution model.
e. The sponsors of the respective FP1 investments "FP1.x" repeat this process their respective FP1 investments.
7. Cash_Usage1 Total claim on a distribution
a. The administrator of level 3 distribution FP1.25.E submits a request to obtain or use the $80K cash distribution in total, and provides TokenAF.25A.EA for InvestorA and tokens for all other FP1.25 investors, each token noting its potential cash value, along with the request.
b. The sponsor of FP1.25:
i. Validates FP1.25's signature on TokenAF.25A.EA.
ii. Verifies that one or more data elements specifying the identity of FP1.25.E are signed by AF.25A.EA.
iii. Verifies that an $800 amount is signed by TokenAF.25A.EA.
c. The sponsor of FP1.25 repeats this process successfully for each token presented.
d. The sponsor of FP1.25 provides $80K in cash to the administrator of FP1.25.E.
8. Cash_Usage2 Partial claim on a distribution
a. The administrator of level 3 distribution FP1.25.E submits a request to obtain or use $4K of the $80K cash distribution, and provides TokenAF.25A.EA for InvestorA and tokens for a subset of other FP1.25 investors, each token noting its potential cash value, along with the request.
b. The sponsor of FP1.25:
i. Validates FP1.25's signature on TokenAF.25A.EA.
ii. Verifies that one or more data elements specifying the identity of FP1.25.E are signed by AF.25A.EA.
iii. Verifies that an $800 amount is signed by TokenAF.25A.EA.

c. The sponsor of FP1.25 repeats this process successfully for each token presented, and verifies that the value of all tokens is $4K.

d. The sponsor of FP1.25 provides $4K in cash to the administrator of FP1.25.E.

9. Cash_Setup7 Recording a claim a. The administrator of FP1.25.E has obtained a private/public key pair that can be used to apply/validate digital signatures.

b. Concurrently with item "d." in Cash_Usage2 or Cash_Usage3, the administrator of FP1.25.E:

i. Applies the administrator of FP1.25.E's digital signature to the combination of:

1. TokenAF.25A.EA
2. The date and amount of the allocation
3. A description for the usage of the claim (i.e. the product or service purchased)

ii. The resulting token TokenAF.25A.EA.D1, is tagged with sufficient information to identify the administrator of FP1.25.E's public key, and provided to InvestorA.

10. Cash_Usage3 Level 1 investment redemption a. F1 provides, as a business service to investors in FP1, a means to invalidate a level 2 investment.

b. InvestorA invalidates TokenAF, which in turn invalidates all tokens TokenAF.x and TokenAF.x.y.

c. FP1 remodels its investment allocation as described in Cash_Setup3, and subsequently executes on that or a subsequent model as described in Cash_Setup4.

11. Cash_Usage4 Total claim exception—invalidated token a. The administrator of level 3 distribution FP1.25.E submits a request to obtain or use the $80K cash distribution in total, and provides TokenAF.25A.EA for InvestorA and tokens for all other FP1.25 investors, each token noting its potential cash value, along with the request.

b. The sponsor of FP1.25 discovers that TokenAF.25A.EA has been invalidated.

c. The sponsor of FP1.25 deals with the $800 shortfall according to its contractual terms with FP1 and FP1.25.E. For example:

i. FP1.25.E might need to adapt to the $800 shortfall.

ii. FP1.25 might need to modify its investment distribution model to transfer tokens to FP1.25.E from another distribution according to priority.

iii. FP1.25 might have a provision with FP1 that FP1 will modify its investment allocation model to cover the shortfall.

Note: Regardless of the immediate solution chosen, all tokens will be refreshed as FP1 executes on its next portfolio model, and the sponsor of FP1.25 subsequently executes its next distribution model; therefore, FP1.25.E will not go unfunded for long (less than an hour) if deemed a worthy use of cash.

This usage of ESTs in investment transactions prevents any subsequent claims on an investor's cash beyond the point of redemption, versus claims being permitted between the point of redemption and the execution of a new investment distribution model. Any tokens for which claims have already been made can be considered "assets that can be valued for sale" in exchange for new tokens in the next round of model execution. This approach obviously has significant implications for legal negotiation between levels of investment, for the levels described in these examples and others; however, ESTs, networks and mathematics make it possible.

12. Cash_Usage5 Partial claim exception—invalidated token a. The administrator of level 3 distribution FP1.25.E submits a request to obtain or use $4K of the $80K cash distribution, and provides TokenAF.25A.EA for InvestorA and tokens for a subset of other FP1.25 investors, each token noting its potential cash value, along with the request.

b. The sponsor of FP1.25 discovers that TokenAF.25A.EA has been invalidated.

c. The sponsor of FP1.25 deals with the $800 shortfall according to its contractual terms with FP1 and FP1.25.E. In addition to the possibilities noted in Cash_Usage4.c., FP1.25 may also request one or more substitute tokens to cover the shortfall, and allow subsequent modeling execution to run its course for the offset amount.

13. Cash_Usage6 Level 2 divestment a. F1 and the sponsor of FP1.25 provide, as a business service to investors in FP1.25, a means to invalidate a level 2 investment token.

b. InvestorA invalidates TokenAF.25A, which in turn invalidates all tokens AF.25A.y.

c. The sponsor of FP1.25 remodels it investment distribution d. F1 remodels FP1 investment allocation as described in Cash_Setup3, and subsequently executes on that or a subsequent model as described in Cash_Setup4.

e. F1 can adapt to InvestorA's unilateral level 2 divestment by:

i. Divesting FP1 of all FP1.25 allocation in its next model
ii. Requiring InvestorA to invest in a different financial product.
iii. Excluding InvestorA from all pro-rata share calculation and token generation involving FP1.25.

14. Cash_Usage7 Level 3 divestment a. F1, the sponsor of FP1.25, and the administrator of FP1.25.E provide, as a business service to investors in FP1.25.E, a means to invalidate a level 3 investment token.

b. InvestorA invalidates TokenAF.25A.EA.

c. The sponsor of FP1.25 remodels it investment distribution d. F1 remodels FP1 investment allocation as described in Cash_Setup3, and subsequently executes on that or a subsequent model as described in Cash_Setup4.

e. F1 can adapt to InvestorA's unilateral level 3 divestment by:

i. Divesting FP1 of all FP1.25 allocation in its next model
ii. Requiring InvestorA to invest in a different financial product.
iii. Excluding InvestorA from all pro-rata share calculation and token generation involving FP1.25.

f. The sponsor of FP1.25 can adapt to InvestorA's unilateral level 3 divestment by:

i. Canceling any further distribution to FP1.25.E, and/or
ii. Excluding InvestorA from all pro-rata share calculation and token generation involving FP1.25.E, or
iii. Requiring FP1 to invest in a different level 2 investment.

15. Cash_Usage8 Individual investment analysis a. F1 provides, as a business service to investors in FP1, a transparency application for analyzing their FP1 investments.

b. The FP1 transparency application:

i. Provides a means for InvestorA to load all ESTs received by copy, both from FP1 and from FP1.x.
ii. Provides a means for InvestorA to calculate aggregate exposure to different types of distributions made by the sponsors of investments FP1.x.
iii. Provides a means for InvestorA to identify idle cash in its investment tree.

16. Cash_Usage9 Aggregate investment analysis
  a. An investment portal "P1" which facilitates InvestorA investment in any number of financial products "FPx" from any number of financial institutions, provides a transparency application for analyzing all of InvestorA's investments.
  b. The P1 transparency application:
    i. Provides a means for InvestorA to load all ESTs received by copy, both from FPx and from FPx.y.
    ii. Provides a means for InvestorA to calculate aggregate exposure to different types of distributions made by the sponsors of investments FPx.y.
    iii. Provides a means for InvestorA to calculate aggregate exposure to different types of investments made by financial products FPx.
    iv. Provides a means for InvestorA to identify idle cash in its investment tree.

One objective inherent in the examples above is to provide ever-deeper analysis of one's investment portfolio. This can be achieved through increasing acceptance and adoption of the relevant technologies at all levels of investment. However, another objective is to empower investors with more powerful and more granular redemption and divestment capabilities. These are completely new tools enabled by ESTs.

Many further enhancements are possible for the example described above. Through encryption, the identity of the original investor and/or the amount of the level1 investment can be retained in confidence, available only to F1/FP1 and InvestorA. In another possible enhancement combining two application examples, TokenFABCT produced in Bank_Setup4 could be used in place of or in combination with TokenAF produced in Cash_Setup2.

CONCLUSION

The examples provided are representative but do not encompass all possible applications of the invention, which can encompasses systems and methodology to securely propagate authorization to use specific functional data elements in digital transactions, while maintaining control over the authorizations that have been propagated, by embedding, through iterative digital signatures applied over distinct propagation events, additional data describing their permitted usage, and requiring verification of those authorizations before executing certain transactions.

Many example applications can be used in combination. Identity and login credentials can combine with virtually all others. Email and phone combinations with others are imaginable. The bank account-cash combination described at the conclusion of the cash example could easily be combined with identity, login and email. If ESTs are used in combination with one another, new opportunities arise for management tools that help users to visualize their "EST structures". In addition, the development of an individual EST token can be visualized as the growth of a chain, adding a link with each digital signature.

The propagation of a functional data element using ESTs can be envisioned as the growth of a tree. Imagine a tree made of chains where all the chain twigs link to larger chain branches which eventually connect to the same chain trunk. If you share your email address with three people, you connect three new branch links to your trunk link.

Further, EST trees can be linked together by signing multiple tokens in the same digital signature event. From the perspective of a digitally-signed transaction event signing multiple ESTs, the convergence of those various EST chains connects branches from multiple distinct EST trees.

These structures are manageable at each link. If a certificate authority invalidates a digital certificate, or if a digital signer invalidates an EST token, a link in the structure has been lost. The implications of that loss can be great or small depending on how well-connected the link is.

Most importantly, the owner of a functional data element can always have the trunk link, which was the primary impetus behind the development of ESTs. With ESTs, the owner of a functional data element can control propagation of authorization, to limit the scope of its usage in the digital world.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method of authenticating electronic credentials using an encapsulated cryptographic token associated with multiple digital signatures, the method comprising the steps of:
  (a) generating, with a cryptographic computer system, an encapsulated cryptographic token associated with multiple digital signatures by:
    providing a private key and a public key of an originator, wherein the private key and the public key of the originator are cryptographically associated such that data encrypted with the public key of the originator can be decrypted with the private key of the originator and data signed with the private key of the originator can be validated with the public key of the originator;
    providing a private key and a public key of a first propagatee, wherein the private key and the public key of the first propagatee are cryptographically associated such that data encrypted with the public key of the first propagatee can be decrypted with the private key of the first propagatee and data signed with the private key of the first propagatee can be validated with the public key of the first propagatee;
    generating a first cryptographic token by digitally signing the combination of: (1) credential data of the originator and (2) identity data of the first propagatee with the cryptographic computer system using the private key of the originator, wherein the first cryptographic token is tagged with the public key of the originator;
    generating a second cryptographic token that encapsulates the first cryptographic token by digitally signing the combination of: (1) the first cryptographic token and (2) identity data of a second propagatee with the cryptographic computer system using the private key of the first propagatee, wherein the second cryptographic token is tagged with the public key of the first propagatee;
  (b) validating authenticity of an entity attempting to use the credential data of the originator with the second cryptographic token by:

receiving identity data of the entity attempting to use the second cryptographic token;

validating, with the cryptographic computer system, whether the first propagatee signed the second cryptographic token using the public key of the first propagatee;

validating, with the cryptographic computer system, the identity data of the entity attempting to use the second cryptographic token by comparing the identity data of the entity attempting to use the second cryptographic token with the identity of the second propagatee in the second cryptographic token to determine whether there is a match;

validating, with the cryptographic computer system, whether the originator signed the first cryptographic token encapsulated in the second cryptographic token using the public key of the originator;

validating, with the cryptographic computer system, the identity data of the first propagatee by comparing the public key of the first propagatee with the identity of the first propagatee in the first cryptographic token to determine whether there is a match;

responsive to validating authenticity of the entity attempting to use the credentials of the originator with the second cryptographic token, allowing usage of credential data of the originator; and responsive to determining the entity attempting to use the credentials of the originator with the second cryptographic token is not authentic, denying usage of the credential data of the originator.

2. The method of claim 1, wherein the originator comprises an application executing on a computing device that requires a cryptographic token for one or more functions of the application, wherein the application generates a first level cryptographic token when establishing a new user by signing the combination of: (1) login credentials of the new user; and (2) identity data of the new user using a private key associated with the application, wherein the first level cryptographic token is tagged with a public key associated with the application.

3. The method of claim 2, further comprising the step of generating a second level cryptographic token that encapsulates the first level cryptographic token generated by the application by digitally signing the combination of: (1) the first level cryptographic token generated by the application and (2) identity data of a second user with the cryptographic computer system using a private key of the new user, wherein the second level cryptographic token is tagged with a public key of the new user.

4. The method of claim 3, wherein the application validates use of the new user's login credentials by an entity attempting to use the second level cryptographic token by:
receiving identity data of the entity attempting to use the second level cryptographic token;
validating, with the cryptographic computer system, whether the new user signed the second level cryptographic token using the public key of the new user;
validating, with the cryptographic computer system, the identity data of the entity attempting to use new user's login credentials by comparing the identity data of the entity attempting to use the second level cryptographic token with the identity of the second user in the second level cryptographic token to determine whether there is a match;
validating, with the cryptographic computer system, whether the application signed the first level cryptographic token encapsulated in the second level cryptographic token using the public key of the application;
validating, with the cryptographic computer system, the identity data of the new user by comparing the public key of the new user with the identity of the new user in the first level cryptographic token to determine whether there is a match;
responsive to validating authenticity of the entity attempting to use the login credentials of the new user with the second level cryptographic token, allowing usage of new user's credentials; and
responsive to determining the second user attempting to use the login credentials of the new user with the second level cryptographic token is not authentic, denying use of the new user's login credentials.

5. The method of claim 4, further comprising generating a third level cryptographic token that encapsulates the first level cryptographic token and the second level cryptographic token by digitally signing the combination of: (1) the second level cryptographic token and (2) identity data of a third user with the cryptographic computer system using a private key of the second user, wherein the third level cryptographic token is tagged with a public key of the second user.

6. The method of claim 5, wherein the application validates use of the new user's login credentials by an entity attempting to use the third level cryptographic token by:
receiving identity data of the third user attempting to use the third level cryptographic token;
validating, with the cryptographic computer system, whether the second user signed the third level cryptographic token using the public key of the second user;
validating, with the cryptographic computer system, the identity data of the entity attempting to use the new user's login credentials by comparing the identity data of the entity attempting to use the third level cryptographic token with the identity data of the third user in the third level cryptographic token to determine whether there is a match;
validating, with the cryptographic computer system, whether the new user signed the second level cryptographic token encapsulated in the third level cryptographic token using the public key of the new user;
validating, with the cryptographic computer system, whether the application signed the first level cryptographic token encapsulated in the second level cryptographic token using the public key of the application;
validating, with the cryptographic computer system, the identity data of the new user by comparing the public key of the new user with the identity data of the new user in the first level cryptographic token to determine whether there is a match;
responsive to validating authenticity of the entity attempting to use the login credentials of the new user with the third level cryptographic token, allowing usage of new user's login credentials; and
responsive to determining the entity attempting to use the credentials of the new user with the third level cryptographic token is not authentic, denying access to use the new user's login credentials.

7. The method of claim 6, wherein creation of the second level cryptographic token and/or the third level cryptographic token includes propagation credentials encapsulated therein that is representative of whether the second user and/or the third user is allowed to propagate the new user's login credentials.

8. The method of claim 7, wherein the application is configured to evaluate propagation credentials encapsulated in the second level cryptographic token and/or the third level cryptographic token.

9. The method of claim 8, wherein the application is configured to deny access to the third user based on the propagation credentials indicating the second user is prohibited from propagating the new user's login credentials even where the application validates authentication of the third level cryptographic token using the public key of the second user.

10. The method of claim 9, wherein the application is configured to deny access to the second user and the third user using the login credentials of the new user responsive to the new user invalidating the second level cryptographic token.

11. The method of claim 1, wherein the originator comprises a mail server configured to send and receive email messages, wherein the mail server is configured to require the combination of (1) an email address and (2) a cryptographic token corresponding to the email address to send an email to the email address, wherein the mail server creates a first level cryptographic token when creating a new email address of a first user by signing the combination of: (1) the first user's email address; and (2) identity data of the first user with a private key associated with the mail server, wherein the first level cryptographic token is tagged with a public key associated with the mail server.

12. The method of claim 11, further comprising generating a second level cryptographic token that encapsulates the first level cryptographic token created by the mail server by digitally signing the combination of: (1) the first level cryptographic token created by the mail server and (2) identification data of the second user, including an email address of the second user, with the cryptographic computer system using a private key of the first user, wherein the second level cryptographic token is tagged with a public key of the first user.

13. The method of claim 12, wherein the mail server is configured to determine whether to deliver an email sent to the first user's email address by:
receiving an email addressed to the first user that does not include a cryptographic token;
evaluating whether the email includes a cryptographic token;
denying delivery of the email responsive to determining that the email does not include a cryptographic token.

14. The method of claim 12, wherein the mail server is configured to determine whether to deliver an email sent to the first user's email address by:
receiving an email addressed to the first user that includes a cryptographic token;
validating, with the cryptographic computer system, whether the first user signed the cryptographic token included with the email using the public key of the first user;
validating, with the cryptographic computer system, whether sender data in the email matches the email address of the second user in the second level cryptographic token;
validating, with the cryptographic computer system, the mail server signed the first level cryptographic token encapsulated in the second level cryptographic token using the public key of the mail server;
validating, with the cryptographic computer system, the identity data of the first user by comparing the public key of the first user with the identity data of the first user in the first level cryptographic token to determine whether there is a match;
responsive to validating authenticity of the cryptographic token included with the email, delivering the email to the first user's email address; and
responsive to determining the cryptographic token included with the email is not authentic, reject delivery of the email.

15. The method of claim 14, wherein creation of the second level cryptographic token includes propagation credentials encapsulated therein that is representative of whether the second user is allowed to propagate the first user's email address.

16. The method of claim 15, wherein the application is configured to evaluate propagation credentials encapsulated in the second level cryptographic token to deny delivery of email from a user to whom the second user propagated the first user's email address.

17. The method of claim 1, wherein the originator comprises a computerized telephone service configured to route telephone calls over a network, wherein the telephone service is configured to require the combination of (1) a telephone number and (2) a cryptographic token corresponding to the telephone number to connect a call with the telephone number, wherein the telephone service creates a first level cryptographic token when creating a new telephone number of a first user by signing the combination of (1) the first user's telephone number; and (2) identity data of the first user with a private key associated with the telephone service, wherein the first level cryptographic token is tagged with a public key associated with the telephone service.

18. The method of claim 17, wherein the first user propagates the first user's telephone number to a second user by creating a second level cryptographic token that encapsulates the first level cryptographic token created by the telephone service by digitally signing the combination of: (1) the first level cryptographic token created by the telephone service and (2) a telephone number of the second user with the cryptographic computer system using a private key of the first user, wherein the second level cryptographic token is tagged with a public key of the first user.

19. The method of claim 18, wherein the telephone service is configured to determine whether to connect a call with the first user's telephone number by:
receiving a call request to the first user's telephone number that does not include a cryptographic token;
evaluating whether the call request includes a cryptographic token;
denying connection responsive to determining that the call request does not include a cryptographic token.

20. The method of claim 19, wherein the telephone service is configured to determine whether to connect a call to the first user's telephone number by:
receiving a call request to the first user's telephone number that includes a cryptographic token;
validating, with the cryptographic computer system, whether the first user signed the cryptographic token included with the call request using the public key of the first user;
validating, with the cryptographic computer system, whether sender data in the call request matches the telephone number of the second user in the second level cryptographic token;
validating, with the cryptographic computer system, the telephone service signed the first level cryptographic token encapsulated in the second level cryptographic token using the public key of the telephone service;

validating, with the cryptographic computer system, the identity data of the first user by comparing the public key of the first user with the identity data of the first user in the first level cryptographic token to determine whether there is a match;

responsive to validating authenticity of cryptographic token included with the call request, connecting the call request with the first user's telephone number; and responsive to determining the cryptographic token included with the call request is not authentic, reject connection to the first user's telephone number.

21. The method of claim 1, wherein the originator comprises an owner of a financial account seeking to initiate one or more financial transactions regarding the financial account, wherein the owner creates a first level cryptographic token by signing the combination of: (1) credentials of the financial account and (2) identity of a financial institution to initiate the one or more financial transactions with a private key associated with the owner, wherein the first level cryptographic token is tagged with a public key associated with the owner.

22. The method of claim 21, further comprising creating a second level cryptographic token that encapsulates the first level cryptographic token created by the owner by digitally signing the combination of: (1) the first level cryptographic token created by the owner and (2) identity data of a wire settlement system with the cryptographic computer system using a private key of the financial institution authorized to initiate one or more transactions on the financial account, wherein the second level cryptographic token is tagged with a public key of the financial institution authorized to initiate one or more transactions on the financial account.

23. The method of claim 22, wherein the wire settlement system validates use of the credentials of the financial account using the second level cryptographic token prior to sending a message with settlement instructions by:
   receiving identity data of an entity attempting to use the second level cryptographic token;
   validating, with the cryptographic computer system, whether the financial institution authorized to initiate one or more transactions on the financial account signed the second level cryptographic token using the public key of the financial institution authorized to initiate one or more transactions on the financial account;
   validating, with the cryptographic computer system, the identity data of the entity attempting to use the account credentials by comparing the identity data of the entity attempting to use the second level cryptographic token with the identity data of the wire settlement system in the second level cryptographic token to determine whether there is a match;
   validating, with the cryptographic computer system, whether the owner of the financial account signed the first level cryptographic token encapsulated in the second level cryptographic token using the public key of the owner;
   validating, with the cryptographic computer system, the identity data of the financial institution by comparing the public key of the financial institution with the identity data of the financial institution in the first level cryptographic token to determine whether there is a match;
   responsive to validating authenticity of the entity attempting to use the account credentials with the second level cryptographic token, sending a message with settlement instructions to perform one or more financial transactions on the financial account; and
   responsive to determining the entity attempting to use the account credentials with the second level cryptographic token is not authentic, denying sending settlement instructions on the financial account.

24. The method of claim 23, wherein creation of the second level cryptographic token includes propagation credentials encapsulated therein that is representative of whether the wire settlement system is allowed to propagate the account credentials.

25. The method of claim 24, wherein creation of the first level cryptographic token and/or the second level cryptographic token includes a wire instruction restriction encapsulated therein that is representative of one or more restrictions in wire instructions regarding the financial account, wherein the wire settlement system is configured to evaluate a proposed settlement instruction to determine whether the proposed settlement instruction includes the restriction, and if so, deny sending a message with the proposed settlement instructions.

26. The method of claim 25, wherein the restriction is a maximum monetary value for the wire instructions and wherein the wire settlement system is configured to evaluate the proposed settlement instructions to determine whether the proposed settlement instructions exceed the maximum monetary value, and if so, deny sending a message with the proposed settlement instructions.

27. The method of claim 25, wherein the restriction is a destination bank account for the wire instructions and wherein the wire settlement system is configured to evaluate the proposed settlement instructions to determine whether the proposed settlement instructions include a proposed destination bank account that does not match the destination bank account, and if so, deny sending a message with the proposed settlement instructions.

28. The method of claim 27, wherein the first level cryptographic token includes a first restriction on wire instructions and the second level cryptographic token includes a second restriction on wire instructions, wherein the wire settlement system is configured to evaluate a proposed settlement instruction to determine whether the proposed settlement instruction includes either the first restriction or the second restriction, and if so, deny sending a message with the proposed settlement instructions.

29. The method of claim 28, wherein the first restriction limits the destination bank account.

30. The method of claim 29, wherein the second restriction limits the proposed settlement instruction to the benefit of a specific trading account.

31. A method of automating electronic fund transfer using an encapsulated cryptographic token associated with multiple digital signatures, the method comprising the steps of:

(a) receiving, at a computer system on a network, a fund transfer request from an entity attempting to transfer funds, the fund transfer request comprising: (1) identity data of the entity attempting to transfer funds; (2) an encapsulated cryptographic token; (3) a proposed source account from which funds are to be removed; and (4) a proposed destination account to which funds are to be transferred, wherein the encapsulated cryptographic token comprises:

(1) a first level cryptographic token comprising the combination of: (a) identifying data of an authorized source financial account of a first entity; (b) identity data of the first entity; and (c) identity data of a financial institution that administers the first entity's authorized source financial account digitally signed with a private key associated with the financial institution, wherein the first level cryptographic token is tagged with a public key associated with the financial institution;

(2) a second level cryptographic token comprising the combination of: (a) the first level cryptographic token; (b) identity data of a second entity; (c) identity data of an authorized destination financial account digitally signed with a private key associated with the first entity, wherein the second level cryptographic token is tagged with a public key associated with the first entity; and (b) validating, by the computer system, authenticity of the fund transfer request by:

(1) validating whether the first entity signed the second level cryptographic token using the public key of the first entity;

(2) validating the identity data of the entity attempting to transfer funds by comparing the identity data of the entity attempting to transfer funds with the identity data of the second entity in the second level cryptographic token to verify there is a match;

(3) validating the proposed destination account by comparing the identity data of the authorized destination account in the second level cryptographic token with the proposed destination account to verify there is a match;

(4) validating whether the financial institution signed the first level cryptographic token using the public key of the financial institution;

(5) validating the identity data of the first entity by comparing the public key of the first entity with the identity data of the first entity in the first level cryptographic token to verify there is a match; and (6) validating the proposed source account by comparing the identity data of the authorized source account in the first level cryptographic token with the proposed source account to verify there is a match;

(c) responsive to validating authenticity of the fund transfer request in each of the validating steps (1)-(6), forwarding the electronic fund transfer request to the financial institution to transfer funds from the authorized source account to the authorized destination account; and (d) responsive to failing one or more of the validating steps (1)-(6), denying the fund transfer request.

32. The method of claim 31, wherein the funds transfer request includes a proposed trading account for which the funds will settle a purchase transaction, and wherein the encapsulated cryptographic token includes a third level cryptographic token comprising the combination of: (a) the second level cryptographic token; (b) identity data of a third entity; (c) identity data of an authorized trading account digitally signed with a private key associated with the second entity, wherein the third level cryptographic token is tagged with a public key associated with the second entity.

33. The method of claim 32, wherein the step of the authenticity of the funds transfer request includes:

(1) validating whether the second entity signed the third level cryptographic token using the public key of the second entity;

(2) validating the identity data of the entity attempting to transfer funds by comparing the identity data of the entity attempting to transfer funds with the identity data of the third entity in the third level cryptographic token to verify there is a match; and (3) validating the proposed trading account by comparing the identity data of the authorized trading account in the third level cryptographic token with the proposed trading account to verify there is a match.

34. The method of claim 33, wherein the fund transfer request is denied if any of the validating steps regarding the third level cryptographic token fail.

\* \* \* \* \*